(12) United States Patent
Stapf et al.

(10) Patent No.: US 12,540,262 B2
(45) Date of Patent: Feb. 3, 2026

(54) TWO COMPONENT (2K) CURABLE ADHESIVE COMPOSITION

(71) Applicant: Henkel AG & Co. KGaA, Duesseldorf (DE)

(72) Inventors: Stefanie Stapf, Essen (DE); Alexandra Lieske, Duesseldorf (DE); Jordan Gutierrez Diaz, Duesseldorf (DE); Thomas Moeller, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 305 days.

(21) Appl. No.: 17/839,006

(22) Filed: Jun. 13, 2022

(65) Prior Publication Data

US 2022/0389289 A1 Dec. 8, 2022

Related U.S. Application Data

(63) Continuation of application No. PCT/EP2020/083109, filed on Nov. 24, 2020.

(30) Foreign Application Priority Data

Dec. 13, 2019 (EP) .................................... 19216098

(51) Int. Cl.
*C09J 133/06* (2006.01)
*B32B 7/12* (2006.01)
(Continued)

(52) U.S. Cl.
CPC ............. *C09J 133/064* (2013.01); *B32B 7/12* (2013.01); *B32B 15/043* (2013.01); *B32B 15/18* (2013.01);
(Continued)

(58) Field of Classification Search
CPC ........ C09J 113/02; C09J 113/064; C09J 9/02; C09J 2433/022; B32B 43/006
See application file for complete search history.

(56) References Cited

U.S. PATENT DOCUMENTS 3,870,675 A 3/1975 Kusayama et al.
8,796,350 B2 8/2014 Liu et al.
(Continued)

FOREIGN PATENT DOCUMENTS

CN 102782072 A 11/2012
CN 103571406 2/2014
(Continued)

OTHER PUBLICATIONS

Leijonmarck, et al., "Electrolytically assisted debonding of adhesives: An experimental investigation", International Journal of Adhesion & Adhesives 32 p. 39-45 (2012).
(Continued)

*Primary Examiner* — Joseph S Del Sole
*Assistant Examiner* — David L Miller
(74) *Attorney, Agent, or Firm* — Steven C. Bauman

(57) ABSTRACT

The present invention is directed to a curable and debondable two-part (2K) adhesive composition comprising: i) a first part comprising: (meth)acrylate monomer; co-polymerizable acid; and, an electrolyte; and, ii) a second part comprising: a first curing agent for the monomers of said first part; a second curing agent for the monomers of said first part; and, a solubilizer.

13 Claims, 7 Drawing Sheets

(51) Int. Cl.

| | | |
|---|---|---|
| *B32B 15/04* | (2006.01) | |
| *B32B 15/18* | (2006.01) | |
| *B32B 15/20* | (2006.01) | |
| *B32B 43/00* | (2006.01) | |
| *C09J 5/00* | (2006.01) | |
| *C09J 9/02* | (2006.01) | |
| *C09J 11/08* | (2006.01) | |
| *C09J 133/02* | (2006.01) | |

(52) U.S. Cl.
CPC ............ *B32B 15/20* (2013.01); *B32B 43/006* (2013.01); *C09J 5/00* (2013.01); *C09J 9/02* (2013.01); *C09J 11/08* (2013.01); *B32B 2250/02* (2013.01); *B32B 2307/54* (2013.01); *C09J 133/02* (2013.01); *C09J 2433/00* (2013.01); *C09J 2463/00* (2013.01)

(56) References Cited

U.S. PATENT DOCUMENTS

| | | | |
|---|---|---|---|
| 2008/0283415 A1* | 11/2008 | Gilbert | B32B 37/12 |
| | | | 205/688 |
| 2014/0235758 A1 | 8/2014 | Cheng et al. | |
| 2017/0158560 A1 | 6/2017 | Gruen et al. | |
| 2017/0355892 A1 | 12/2017 | Heucher et al. | |
| 2018/0305593 A1 | 10/2018 | Akamatsu et al. | |
| 2018/0320025 A1 | 11/2018 | Sweeney et al. | |
| 2019/0203081 A1 | 7/2019 | D'Haese et al. | |

FOREIGN PATENT DOCUMENTS

| | | | |
|---|---|---|---|
| CN | 108138026 A | | 6/2018 |
| CN | 108977135 | | 12/2018 |
| CN | 109054661 | | 12/2018 |
| CN | 109054661 A | * | 12/2018 |
| CN | 109563389 A | | 4/2019 |
| CN | 110536941 A | | 12/2019 |
| CN | 110869459 A | | 3/2020 |
| DE | 102014109355 A1 | | 1/2016 |
| JP | S5695966 A | | 8/1981 |
| JP | S5714669 | | 1/1982 |
| JP | 2005120215 A | | 5/2005 |
| JP | 2017095590 A | | 6/2017 |
| JP | 2018188602 | | 11/2018 |
| WO | 2017006799 A1 | | 1/2017 |
| WO | 2018081941 A1 | | 5/2018 |
| WO | 2018195524 A1 | | 10/2018 |
| WO | 2019113298 A1 | | 6/2019 |

OTHER PUBLICATIONS

Sotta, et al., "Application of electrochemical impedance spectroscopy to the study of ionic transport in polymer-based electrolytes", Progress in organic coatings 69 p. 2017-214 (2010).

Leijonmarck, et al., "Electrochemical Characterization of Electrically Induced Adhesive Debonding"; Journal of The Electrochemical Society, 158 (10) p. 109-p. 114 (2011).

PCT International Search Report issued in connection with International Patent Application No. PCT/EP2020/083109—Mailing date: Feb. 11, 2021.

* cited by examiner

TWO COMPONENT (2K) CURABLE ADHESIVE COMPOSITION

FIELD OF THE INVENTION

The present invention is directed to an adhesive composition which can be debonded from particular substrates to which it is applied. More particularly, the present invention is directed to a two-part (2K) curable and debondable adhesive composition.

BACKGROUND TO THE INVENTION

Adhesive bonds and polymeric coatings are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue and seal the joints from corrosive species.

Whilst adhesive bonds thus offer many advantages over mechanical fasteners, it tends to be difficult to disassemble adhesively bonded objects where this is required in practical applications. The removal of the adhesive through mechanical processes—such as by sand blasting or by wire brushing—is often precluded, in part because the adhesive is disposed between substrates and is thus either inaccessible or difficult to abrade without corrupting the substrate surfaces. Disassembly through the application of chemicals and/or high temperature—such as disclosed in U.S. Pat. No. 4,171,240 (Wong) and U.S. Pat. No. 4,729,797 (Linde et al.)—might be effective but can be time consuming and complex to perform: moreover, the aggressive chemicals and/or harsh conditions required can damage the substrates being separated, rendering them unsuitable for subsequent applications.

Noting these problems, certain authors have sought to develop debondable adhesive compositions, wherein the passage of an electrical current through the cured compositions acts to disrupt the bonding at the interface of the adhesive and the substrate.

U.S. Pat. No. 7,465,492 (Gilbert) describes an disbondable composition comprising: a matrix functionality comprising a monomer selected from the group consisting of acrylics, methacrylics and combinations thereof; a free radical initiator; and, an electrolyte, wherein the electrolyte provides sufficient ionic conductivity to said composition to support a faradaic reaction at a bond formed between the composition and an electrically conductive surface and thus allows the composition to disbond from the surface.

US 2007/0269659 (Gilbert) describes an adhesive composition disbondable at two interfaces, the composition: (i) comprising a polymer and an electrolyte; (ii) facilitating joinder of two surfaces; and, (iii) in response to a voltage applied across both surfaces so as to form an anodic interface and a cathodic interface, disbonding from both the anodic and cathodic surfaces.

US 2008/0196828 (Gilbert) describes a hot-melt adhesive composition comprising: a thermoplastic component; and, an electrolyte, wherein the electrolyte provides sufficient ionic conductivity to the composition to enable a faradaic reaction at a bond formed between the composition and an electrically conductive surface and to allow the composition to disbond from the surface.

WO2017/133864 (Henkel AG & Co. KGaA) describes a method for reversibly bonding a first and a second substrate, wherein at least the first substrate is an electrically non-conductive substrate, the method comprising: a) coating the surface of the electrically non-conductive substrate(s) with a conductive ink; b) applying an electrically debondable hot melt adhesive composition to the conductive ink-coated surface of the first substrate and/or the second substrate; c) contacting the first and the second substrates such that the electrically debondable hot melt adhesive composition is interposed between the two substrates; d) allowing formation of an adhesive bond between the two substrates to provide bonded substrates; and, e) applying a voltage to the bonded substrates whereby adhesion at least one interface between the electrically debondable hot melt adhesive composition and a substrate surface is substantially weakened.

There remains a need in the art to provide an adhesive composition which can be conveniently applied to the surfaces of substrates to be bonded, which upon curing thereof can provide an effective bond within composite structures containing said substrates but which can be effectively de-bonded from those substrates by the facile application of an electrical potential across the cured adhesive.

STATEMENT OF THE INVENTION

In accordance with a first aspect of the invention there is provided a curable and debondable two-part (2K) adhesive composition comprising:
    a first part comprising:
        (meth)acrylate monomer;
        co-polymerizable acid; and,
        an electrolyte; and,
    a second part comprising:
        a first curing agent for the monomers of said first part;
        a second curing agent for the monomers of said first part; and,
        a solubilizer.

The adhesive composition may further comprise electrically conductive particles—in particular carbon black and silver particles—which may be disposed in one or both of the first and second parts thereof.

In important embodiments of the invention, the two part-part adhesive composition comprises:
    a first part comprising, based on the weight of said first part:
        from 20 to 80 wt. %, preferably from 40 to 75 wt. %, of said (meth)acrylate monomer;
        from 0.25 to 20 wt. %, preferably from 6 to 16 wt. %, of said co-polymerizable acid; and,
        from 2.5 to 25 wt. %, preferably from 4 to 23 wt. %, of said electrolyte; and,
    a second part comprising, based on the weight of said second part:
        from 25 to 75 wt. % of said first curing agent;
        from 0.01 to 5 wt. %, preferably from 0.03 to 1 wt. % of said second curing agent; and,
        from 20 to 45 wt. %, preferably from 28 to 40 wt. % of said solubilizer.

In the first part of the adhesive composition, said co-polymerizable acid is preferably selected from the group consisting of methacrylic acid, acrylic acid, itaconic acid, maleic acid, aconitic acid, crotonic acid, fumaric acid and mixtures thereof: a particular preference for methacrylic acid is noted.

Independently of or additional to this statement of preference for the co-polymerizable acid of said first part, said electrolyte is preferably selected from the group consisting of 1-ethyl-3-methylimidazolium methansulfonate, 1-ethyl- 3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di(2-hydroxyethyl) ammonium trifluoroaetate, N,N-dimethyl (2-hydroxyethyl) ammonium octanoate, methyltrioctylammonium bis(trifluoromethylsulfonyl)imide, N-ethyl-N—N—N—N-tetramethylguanidinium trifluoromethanesulfonate, guanidinium trifluoromethanesulfonate, 1-butyl-4-methylpyridinium bromide, 1-buthyl-3-methylpyridinium tetrafluoroborate, 1-butyl-3-hydroxymethylpyridinium ethylsulfate, 1-butyl-1-methylpyrrolidinium bis (trifluoromethylsulfonyl)imide, 1-butyl-methylpyrrolidinium tris(pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2,3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof. A particular preference for the use of at least one of 1-ethyl-3-methylimidazolium methansulfonate, 1-ethyl-3-methylimidazolium methyl sulfate, may be mentioned.

In the second part of the adhesive composition, it is preferred that said first curing agent is a peroxide curing agent preferably selected from the group consisting of tert-butyl peroxide, tert-butyl perbenzoate, cumene hydroperoxide, tert-butyl peroxybenzoate, diacetyl peroxide, benzoyl peroxide, tert-butyl peracetate, lauryl peroxide and mixtures thereof: the use of benzoyl peroxide is particularly preferred.

Independently of or additional to this statement of preference for the first curing agent, said second curing agent preferably consists of at least one compound which is a salt, or a complex of a transition metal selected from the group consisting of Fe, Co, V, Mn and Cu. More preferably, the second curing agent comprises or consists of at least one iron-based compound selected from the group consisting of ferrocene, iron(II) acetylacetonate, ammonium iron (III) hexakis (cyano-C)ferrat: a particular preference for ferrocene is noted.

Independently of or additional to the statements of preference for the first and second curing agents, it is preferred that the solubilizer of the second part of the adhesive composition is either polyethylene glycol or epoxy resin selected from the group consisting of cycloaliphatic epoxides, epoxy novolac resins, bisphenol-A-epoxy resins, bisphenol-F-epoxy resins, bisphenol-A epichlorohydrin based epoxy resins, alkyl epoxides, limonene dioxides, polyepoxides and mixtures thereof: a particular preference for solubilizer comprising or consisting of bisphenol-A epoxy resin is noted.

In accordance with a second aspect of the invention, there is provided a bonded structure comprising:
 a first material layer having an electrically conductive surface; and,
 a second material layer having an electrically conductive surface, wherein the cured debondable two-part (2K) adhesive composition as defined hereinabove and in the appended claims is disposed between said first and second material layers.

In accordance with a third aspect of the present invention, there is provided a method of debonding said bonded structure as defined hereinabove and in the appended claims, the method comprising the steps of:
 i) applying a voltage across both surfaces to form an anodic interface and a cathodic interface; and,
 ii) debonding the surfaces.

Step i) of this method is preferably characterized by at least one of:
 a) an applied voltage of from 0.5 to 100 V; and,
 b) the voltage being applied for a duration of from 1 second to 60 minutes.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0 to x" specifically includes 0 wt. %: the ingredient defined by said range may be absent from the composition or may be present in the composition in an amount up to x wt. %.

The words "preferred", "preferably", "desirably and" "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

"Two-part (2K) compositions" in the context of the present invention are understood to be compositions in which a first part (A) and a second part (B) must be stored in separate vessels because of their (high) reactivity. The two parts are mixed only shortly before application and then react, typically without additional activation, with bond formation and thereby formation of a polymeric network. Herein higher temperatures may be applied in order to accelerate the cross-linking reaction.

As used herein the term "debondable" means that, after curing of the adhesive, the bond strength can be weakened by at least 50% upon application of an electrical potential of from 10V-75V for a duration of from 1 s to 60 minutes. The cured adhesive is applied between two substrates which are bonded by said adhesive so that an electric current is running through the adhesive bond line. Bond strength is measured by Tensile Lap Shear (TLS) test performed at room temperature and based upon EN 1465:2009 (German version) Based on Adhesives—Determination of tensile lap-shear strength of bonded assemblies. The bond overlapping area was 25 mm×10 mm with a bond thickness of about 150 μm.

As used herein, the term "monomer" refers to a substance that can undergo a polymerization reaction to contribute constitutional units to the chemical structure of a polymer. The term "monofunctional", as used herein, refers to the possession of one polymerizable moiety. The term "polyfunctional", as used herein, refers to the possession of more than one polymerizable moiety.

As used herein, the term "equivalent (eq.)" relates, as is usual in chemical notation, to the relative number of reactive groups present in the reaction.

The term "electrolyte" is used herein in accordance with its standard meaning in the art as a substance containing free ions which can conduct electricity by displacement of charged carrier species. The term is intended to encompass molten electrolytes, liquid electrolytes, semi-solid electrolytes and solid electrolytes wherein at least one of the cationic or anionic components of their electrolyte structure is essentially free for displacement, thus acting as charge carrier.

The curable adhesive compositions of the present invention and the cured adhesives obtained therefrom possess "electrolyte functionality" in that the adhesive material permits the conduction of ions, either anions, cations or both. The electrolyte functionality is understood to derive from the ability of the compositions and cured adhesives to solvate ions of at least one polarity.

As used herein, "(meth)acryl" is a shorthand term referring to "acryl" and/or "methacryl". Thus, the term "(meth) acrylamide" refers collectively to acrylamide and methacrylamide.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. Where applicable, a preference for a given substituent will be noted in the specification. In general, however, a preference for alkyl groups containing from 1-18 carbon atoms ($C_1$-$C_{18}$ alkyl)— for example alkyl groups containing from 1 to 12 carbon atoms ($C_1$-$C_{12}$ alkyl) or from 1 to 6 carbon atoms ($C_1$-$C_6$ alkyl)—should be noted.

The term "$C_1$-$C_{18}$ hydroxyalkyl" as used herein refers to a HO-(alkyl) group having from 1 to 18 carbon atoms, where the point of attachment of the substituent is through the oxygen-atom and the alkyl group is as defined above.

An "alkoxy group" refers to a monovalent group represented by —OA where A is an alkyl group: non-limiting examples thereof are a methoxy group, an ethoxy group and an iso-propyloxy group. The term "$C_1$-$C_{18}$ alkoxyalkyl" as used herein refers to an alkyl group having an alkoxy substituent as defined above and wherein the moiety (alkyl-O-alkyl) comprises in total from 1 to 18 carbon atoms: such groups include methoxymethyl (—$CH_2OCH_3$), 2-methoxyethyl (—$CH_2CH_2OCH_3$) and 2-ethoxyethyl.

The term "$C_2$-$C_4$ alkylene" as used herein, is defined as saturated, divalent hydrocarbon radical having from 2 to 4 carbon atoms.

The term "$C_3$-$C_{30}$ cycloalkyl" is understood to mean an optionally substituted, saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; ($C_1$-$C_4$)alkylphenyl, such as tolyl and ethylphenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to:— CH=$CH_2$; —CH=CH$CH_3$; —$CH_2$CH=$CH_2$; —C(=$CH_2$)($CH_3$); —CH=CH$CH_2CH_3$; —$CH_2$CH=CH$CH_3$; —$CH_2CH_2$CH=$CH_2$; —CH=C($CH_3$)$_2$; —$CH_2$C(=$CH_2$)($CH_3$); —C(=$CH_2$)$CH_2CH_3$; —C($CH_3$)=CH$CH_3$; —C($CH_3$)CH=$CH_2$; —CH=CH$CH_2CH_2CH_3$; —$CH_2$CH=CH$CH_2CH_3$; —$CH_2CH_2$CH=CH$CH_3$; —$CH_2CH_2CH_2$CH=$CH_2$; —C(=$CH_2$)$CH_2CH_2CH_3$; —C($CH_3$)=CH$CH_2CH_3$; —CH($CH_3$)CH=CH$CH$; —CH($CH_3$)$CH_2$CH=$CH_2$; —$CH_2$CH=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above. Further, as used herein "aralkyl" means an alkyl group substituted with an aryl radical as defined above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl", "heterocycloalkyl" and "heteroaryl" moieties are alkyl, cycloalkyl and aryl groups as defined hereinabove, respectively, containing N, O, Si or S as part of their structure.

The term "equivalent weight" as used herein refers to the molecular weight divided by the number of a function concerned. As such, "epoxy equivalent weight" (EEW) means the weight of resin, in grams, that contains one equivalent of epoxy.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

The molecular weights referred to in this specification can be measured with gel permeation chromatography (GPC) using polystyrene calibration standards, such as is done according to ASTM 3536.

Viscosities of the compositions described herein are, unless otherwise stipulated, measured using the Anton Paar Viscometer, Model MCR 301 at standard conditions of 25° C. and 50% Relative Humidity (RH). The viscometer is calibrated one time a year and checked by services. The calibration is done with using special oil of known viscosity, which vary from 5,000 cps to 50,000 cps (parallel plate PP25 and at shear rate 1 1/s at 23° C.). Measurements of the compositions according to the present invention are done using the parallel plate PP20 at different shear rates from 1.5 1/s to 100 1/s.

DETAILED DESCRIPTION OF THE INVENTION

First Part of the Two-Part (2K) Composition

The first part of the two-part (2K) composition comprises: (meth)acrylate monomer; co-polymerizable acid; and, an electrolyte.

(Meth)Acrylate Monomer

The first part of the composition comprises (meth)acrylate monomer which will typically be present in an amount of from 20 to 80 wt. %, based on the weight of said first part: it is preferred that (meth)acrylate monomer constitutes from 40 to 75 wt. %, for example from 47 to 68 wt. % or from 53 to 60 wt. % of said first part.

These (meth)acrylate monomer quantities are preferred because quantity greater than 80% may adversely affect initial adhesion properties and debonding effect, whereas low quantities, mainly below 20% may lead to decrease in initial adhesion properties.

There is no particular intention to limit (meth)acrylate esters having utility herein and it is considered that the (meth)acrylate monomers may be any ester of acrylic acid or methacrylic acid known to the art. That said, exemplary (meth)acrylic monomers include but are not limited to:

$C_1$-$C_{18}$ alkyl esters of (meth)acrylic acid, such as methyl (meth)acrylate, ethyl (meth)acrylate, n-propyl (meth) acrylate, isopropyl (meth)acrylate, butyl (meth)acrylate (all isomers), hexyl (meth)acrylate, n-heptyl(meth) acrylate, n-octyl(meth)acrylate, 2-ethylhexyl (meth) acrylate, n-nonyl(meth)acrylate, n-decyl(meth)acrylate, n-dodecyl(meth)acrylate and n-stearyl(meth) acrylate;

$C_3$-$C_{18}$ cycloalkyl esters of (meth)acrylic acid, such as cyclohexyl(meth)acrylate and isobornyl(meth)acrylate;

$C_6$-$C_{18}$ aryl esters of (meth)acrylic acid, such as phenyl (meth)acrylate and tolyl(meth)acrylate;

$C_7$-$C_{24}$ aralkyl esters of (meth)acrylic acid, such as benzyl (meth)acrylate;

$C_1$-$C_{18}$ alkoxyalkyl esters of (meth)acrylic acid, such as 2-methoxyethyl(meth)acrylate, 2-ethoxyethyl(meth) acrylate and 3-methoxybutyl(meth)acrylate;

fluorine-containing $C_1$-$C_{18}$ alkyl esters of (meth)acrylic acid, such as trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl (meth)acrylate and 2-perfluorohexadecylethyl(meth) acrylate;

$C_1$-$C_{18}$ hydroxyalkyl esters of (meth)acrylic acid, such as 2-hydroxyethyl(meth)acrylate, 2-hydroxypropyl(meth) acrylate and pentaerythritol tri(meth)acrylate;

di/poly-esters of di/poly-functional alcohols, such as ethylene glycol di(meth)acrylate, 1,3 or 1,4-butanediol di(meth)acrylate, 1,6-hexanediol di(meth)acrylate and trimethylolpropane tri(meth)acrylate; $C_1$-$C_{18}$ aminoalkyl esters of (meth)acrylic acid, such as 2-aminoethyl (meth)acrylate, dimethylaminoethyl (meth)acrylate and (meth)acryloxyethoxyethylamine;

$C_1$-$C_{18}$ alkoxysilyl-containing alkyl esters of (meth) acrylic acid, such as γ-(methacryloyloxypropyl) trimethoxysilane;

ethylene oxide or propylene oxide adducts of (meth) acrylic acid; and, (meth)acrylate esters formed by alcohols bearing other functional groups, such as tetrahydrofurfuryl (meth) acrylate.

For completeness, it is not precluded that the first part of the composition comprises a macro-monomer component consisting of one or more oligomers selected from the group consisting of urethane (meth)acrylates, polyester (meth) acrylates and polyether (meth)acrylates. However, such oligomeric compounds—which may be mono- or polyfunctional with respect to the polymerizable (meth)acrylate functionality but which are based on repeated structural urethane, ester and ether subunits—should not usually constitute more than 30 wt. % of the total of (meth)acrylate monomers in said first part.

As is known in the art, urethane (meth)acrylate oligomers may be prepared by reaction of a polyfunctional (meth) acrylate bearing a hydroxyl group with a polyisocyanate as defined herein above. In particular, the polyfunctional (meth)acrylate bearing a hydroxyl group may be selected from the group consisting of: 2-hydroxyethyl (meth)acrylate; 2-hydroxyisopropyl (meth)acrylate; 4-hydroxybutyl (meth)acrylate; hydroxyethylcaprolactone (meth)acrylate; pentaerythritol tri(meth)acrylate; pentaerythritol tetra(meth) acrylate; dipentaerythritol penta(meth)acrylate; dipentaerythritol hexa(meth)acrylate; and, combinations thereof.

Suitable polyester (meth)acrylate oligomers are obtained by reacting (meth)acrylic acid with a polyester prepared from a polybasic acid or an anhydride thereof and a polyhydric alcohol. Examples of the polybasic acid include but are not limited to: phthalic acid; succinic acid; adipic acid; glutaric acid; sebacic acid; isosebacic acid; tetrahydrophthalic acid; hexahydrophthalic acid; dimer acid; trimellitic acid; pyromellitic acid; pimelic acid; and, azelaic acid. Examples of the polyhydric alcohol include but are not limited to: 1,6-hexanediol; diethylene glycol; 1,2-propylene glycol; 1,3-butylene glycol; neopentyl glycol; dipropylene glycol; polyethylene glycol; and, polypropylene glycol.

As is known in the art, polyether (meth)acrylate oligomers may be obtained by an ester exchange reaction between a polyether and a (meth)acrylate ester, such as ethyl methacrylate. Exemplary polyethers include polyethers obtained from ethoxylated or propoxylated trimethylolpropane, pentaerythritol or the like, or by polyetherification of 1,4-propanediol or the like.

In preferred embodiment, the first part comprises at least one (meth)acrylate monomer selected from the group consisting of: methyl (meth)acrylate; ethyl (meth)acrylate; n-propyl (meth)acrylate; isopropyl (meth)acrylate; n-butyl (meth)acrylate; isobutyl (meth)acrylate; tert-butyl (meth)acrylate; n-pentyl (meth)acrylate; n-hexyl (meth)acrylate; cyclohexyl (meth)acrylate; n-heptyl (meth)acrylate; n-octyl (meth)acrylate; 2-ethylhexyl-(meth)acrylate; nonyl (meth) acrylate; decyl (meth)acrylate; dodecyl (meth)acrylate; phenyl (meth)acrylate; tolyl (meth)acrylate; benzyl (meth) acrylate; 2-methoxyethyl (meth)acrylate; 3-methoxybutyl (meth)acrylate; 2-hydroxyethyl (meth)acrylate; 2-hydroxypropyl(meth)acrylate; stearyl(meth)acrylate; glycidyl (meth)acrylate; isobornyl (meth)acrylate; 2-aminoethyl (meth)acrylate; y-(meth)acryloyloxypropyl trimethoxysilane; (meth)acrylic acid-ethylene oxide adduct; trifluoromethylmethyl (meth)acrylate; 2-trifluoromethylethyl (meth) acrylate; 2-perfluoro ethylethyl (meth)acrylate; 2-perfluoroethyl-2-perfluorobutylethyl (meth)acrylate; 2-perfluoroethyl (meth)acrylate; perfluoromethyl (meth) acrylate; diperfluoromethylmethyl (meth)acrylate; 2-perfluoromethyl-2-perfluoroethylmethyl (meth)acrylate; 2-perfluorohexylethyl (meth)acrylate; 2-perfluorodecylethyl (meth)acrylate; 2-perfluorohexadecylethyl (meth)acrylate; ethoxylated trimethylolpropane triacrylate; trimethylol propane trimethacrylate; dipentaerythritol monohydroxypentacrylate; pentaerythritol triacrylate; ethoxylated trimethylolpropane triacrylate; 1,6-hexanedioldiacrylate; neopentyl glycoldiacrylate; pentaerythritol tetraacrylate; 1,2-butylene glycoldiacrylate; trimethylopropane ethoxylate tri(meth) acrylate; glyceryl propoxylate tri(meth) acrylate; trimethylolpropane tri(meth)acrylate; dipentaerythritol monohydroxy penta(meth)acrylate; tripropyleneglycol di(meth)acrylate; neopentylglycol propoxylate di(meth)acrylate; 1,4-butanediol di(meth)acrylate; triethyleneglycol di(meth)acrylate; butylene glycol di(meth)acrylate; and, ethoxylated bisphenol A di(meth)acrylate.

Good results have been obtained where the first part comprises at least one (meth)acrylate monomer selected from the group consisting of methyl (meth)acrylate, ethyl (meth)acrylate, isobornyl (meth)acrylate, ethoxylated trimethylolpropanetriacrylate and trimethylolpropane triacrylate and mixtures thereof.

Above listed (meth)acrylate monomers are preferred because it is believed that the size of the monomer leads to a formation of an ideal polymer network, which increases ion transport.

Co-Polymerizable Acid

As noted above, the first part of the composition comprises co-polymerizable acid which should typically be employed in an amount of from 0.25 to 20 wt. %, based on the weight of the first part: the co-polymerizable acid may preferably constitute from 6 to 16 wt. %, for example from 10 to 13 wt. % of said first part. For completeness, whilst such monomers should typically be used in the form of free acid, it is not precluded that the constituent acid groups of the monomers be partially or completely neutralized with suitable bases, provided this does not compromise their participation in co-polymerization.

These co-polymerizable acid quantities are preferred because quantity greater than 20% may cause corrosion issues and gas evolution, whereas low quantities may lead to an incomplete cure and therefore decrease initial adhesion properties.

Without intention to limit the present invention, co-polymerizable acid monomers should be selected from: ethylenically unsaturated carboxylic acids; ethylenically unsaturated sulfonic acids; and; vinylphosphonic acid. Suitable ethylenically unsaturated sulfonic acids are, for instance, vinylsulfonic acid, styrenesulfonic acid and acrylamidomethylpropanesulfonic acid.

Preferably the co-polymerizable acid of this part comprises or consists of ethylenically unsaturated carboxylic acids selected from the group consisting of: α,β-monoethylenically unsaturated monocarboxylic acids; α,β-monoethylenically unsaturated dicarboxylic acids; $C_1$-$C_6$ alkyl half-esters of α,β-monoethylenically unsaturated dicarboxylic acids; α,β-monoethylenically unsaturated tricarboxylic acids; and, $C_1$-$C_6$ alkyl esters of α,β-monoethylenically unsaturated tricarboxylic acids bearing at least one free carboxylic acid group; and, mixtures thereof. In particular, the co-polymerizable acid of this part comprises or consists of at least one acid selected from methacrylic acid, acrylic acid, itaconic acid, maleic acid, aconitic acid, crotonic acid and fumaric acid.

The Applicant have found out that the co-polymerizable acid will improve the cure speed and metal adhesion of the composition.

It is noted that the present invention does not preclude the presence in the first part of vinyl monomers which can be copolymerized with (meth)acrylate monomers and which are selected from the group consisting of: styrene monomers, such as styrene, vinyltoluene, α-methylstyrene and chlorostyrene; fluorine containing vinyl monomers, such as perfluoroethylene, perfluoropropylene and fluorinated vinylidene; silicon containing vinyl monomers such as vinyltrimethoxysilane and vinyltriethoxysilane; maleimide monomers, such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group containing vinyl monomers, such as acrylonitrile and methacrylonitrile; amide group containing vinyl monomers, such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allylalcohol. However, when included, such vinyl co-monomers should constitute less than 40 wt. %, preferably less than 20 wt. % or less than 10 wt. %, based on the total weight of co-polymerizable acid monomers.

Electrolyte

The first part of the composition comprises from 2.5 to 25 wt. %, based on the weight of the first part, of electrolyte: the electrolyte may preferably constitute from 4 to 23 wt. %, for example from 5 to 20 wt. % of said first part.

These quantities are preferred because quantity greater than 25% of electrolyte may lead to good debonding effect, however the cure may be incomplete and therefore, initial adhesive properties may be adversely affected, whereas low quantities may lead to a lack of debonding effect.

The electrolyte preferably comprises at least one salt having a Formula selected from the group consisting of:

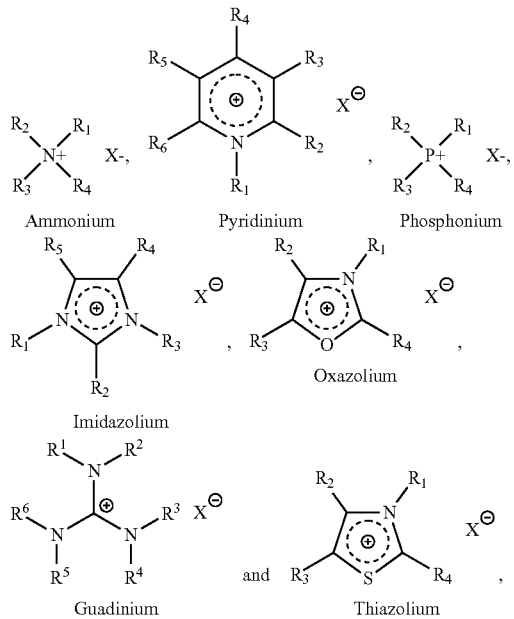

wherein: $R^1$, $R^2$, $R^3$, $R^4$, $R^5$ and $R^6$ are independently selected from hydrogen,
$C_{18}$ alkyl, $C_3$-$C_{18}$ cycloalkyl, $C_6$-$C_{18}$ aryl, $C_7$-$C_{24}$ aralkyl, $C_2$-$C_{20}$ alkenyl, —C(O)$R^q$, —C(O)OH, —CN and —NO$_2$; and, $R^q$ is $C_1$-$C_6$ alkyl.

For completeness, the terms $C_1$-$C_{18}$ alkyl, $C_3$-$C_{18}$ cycloalkyl, $C_6$-$C_{18}$ aryl, $C_7$-$C_{24}$ aralkyl, $C_2$-$C_{20}$ alkenyl expressly includes groups wherein one or more hydrogen atoms are substituted by halogen atoms (e.g. $C_1$-$C_{18}$ haloalkyl) or hydroxyl groups (e.g. $C_1$-$C_{18}$ hydroxyalkyl). In particular, it is preferred that $R^1$, $R^2$, $R^3$, $R^4$, $R^5$ and $R^6$ are independently selected from hydrogen, $C_1$-$C_{12}$ alkyl, $C_1$-$C_{12}$ haloalkyl, $C_1$-$C_{12}$ hydroxyalkyl and $C_3$-$C_{12}$ cycloalkyl. For example, $R^1$, $R^2$, $R^3$, $R^4$, $R^5$ and $R^6$ may be independently selected from hydrogen, $C_1$-$C_6$ alkyl, $C_1$-$C_6$ haloalkyl and $C_1$-$C_6$ hydroxyalkyl.

There is no particular intention to limit the counter anion (X–) which may be employed in the electrolyte. Exemplary anions may be selected from:

Halides;
Pseudohalides and halogen-containing compounds of the formulae $PF_6^-$, $CF_3SO_3^-$, $(CF_3SO_3)_2N^-$, $CF_3CO_2^-$ and $CCl_3CO_2^-$,
$CN^-$, $SCN^-$ and $OCN^-$;
Phenates;
Sulfates, sulfites and sulfonates of the general formulae $SO_4^{2-}$, $HSO_4^-$, $SO_3^{2-}$, $HSO_3^-$, $R^aSO_3^-$ and $R^aSO_3^-$;
Phosphates of the general formulae $PO_4^{3-}$, $HPO_4^{2-}$, $H_2PO_4^-$, $R^aPO_4^{2-}$, $HR^aPO_4^-$ and $R^aR^bPO_4^-$;
Phosphonates and phosphinates of the general formulae $R^aHPO_3^-$, $R^aR^bPO_2^-$ and $R^aR^bPO_3^-$;
Phosphites of the general formulae: $PO_3^{3-}$, $HPO_3^{2-}$, $H_2PO_3^-$ $R^aPO_3^{2-}$, $R^aHPO_3^-$ and $R^aR^bPO_3^-$;
Phosphonites and phosphinites of the general formulae $R^aR^bPO_2^-$, $R^aHPO_2^-$, $R^aR^bPO^-$ and $R^aHPO^-$;
Carboxylic acid anions of the general formula $R^aCOO^-$;
Hydroxycarboxylic acids anions and sugar acid anions;
Saccharinates (salts of o-benzoic acid sulfimide);
Borates of the general formulae $BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$ and $B(R^aSO_4)^-$;
Boronates of the general formulae $R^aBO_2^{2-}$ and $R^aR^bBO^-$;
Carbonates and carbonic acid esters of the general formulae $HCO_3^-$, $CO_3^{2-}$ and $R^aCO_3^-$;
Silicates and silicic acid esters of the general formulae $SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$ and $HR^aR^bSiO_4^-$;
Alkyl- and arylsilanolates of the general formulae $R^aSiO_3^{3-}$, $R^aR^bSiO_2^{2-}$, $R^aR^bR^cSiO_3^-$, $R^aR^bR^cSiO_3^-$, $R^aR^bR^cSiO_2^-$ and $R^aR^bSiO_3^{2-}$;
Pyridinates and pyrimidinates;
Carboxylic acid imides, bis(sulfonyl)imides and sulfonylimides of the general formulae:

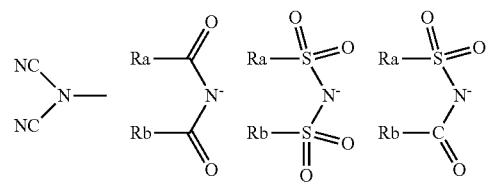

Methide of the general formula:

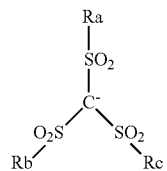

Alkoxides and aryloxides of the general formula $R^aO^-$; and,
Sulfides, hydrogen sulfides, polysulfides, hydrogen polysulfides and thiolates of the general formulae $S^{2-}$, $HS^-$, $[S_v]^{2-}$, $[HSS]^-$ and $[R^aS]^-$ in which general formulae v is a whole positive number of from 2 to 10.
$R^a$, $R^b$, $R^c$ and Rd are independently selected from hydrogen, a $C_1$-$C_{12}$ alkyl, $C_5$-$C_{12}$ cycloalkyl, $C_5$-$C_{12}$ heterocycloalkyl, $C_6$-$C_{18}$ aryl and $C_5$-$C_{18}$ heteroaryl.

Based on the definitions in the above list, preferred anions are selected from the group consisting of: halides; pseudohalides and halogen-containing compounds as defined above; carboxylic acid anions, in particular formate, acetate, propionate, butyrate and lactate; hydroxycarboxylic acid anions; pyridinates and pyrimidinates; carboxylic acid imides, bis(sulfonyl)imides and sulfonylimides; sulfates, in particular methyl sulfate and ethyl sulfate; sulfites; sulfonates, in particular methansulfonate; and, phosphates, in particular dimethyl-phosphate, diethyl-phosphate and di-(2-ethylhexyl)-phosphate.

The electrolyte of the first part is preferably selected from the group consisting of 1-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di(2-hydroxyethyl) ammonium trifluoroaetate, N,N-dimethyl (2-hydroxyethyl) ammonium octanoate, methyltrioctylammonium bis (trifluoromethylsulfonyl) imide, N-ethyl-N—N—N—N-tetramethylguanidinium trifluoromethanesulfonate, guanidinium trifluoromethanesulfonate, 1-butyl-4-methylpyridinium bromide, 1-butyl-3-methylpyridinium tetrafluoroborate, 1-butyl-3-hydroxymethylpyridinium ethylsulfate, 1-butyl-1-methylpyrrolidinium bis (trifluoromethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2,3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof. A particular preference for the use of at least one of 1-ethyl-3-methylimidazolium methansulfonate, 1-ethyl-3-methylimidazolium methyl sulfate may be mentioned.

Second Part of the Two-Part (2K) Composition

The second part of the two-part composition comprises: a first curing agent; a second curing agent; and, a solubilizer.

First Curing Agent

As noted above, the second part of the composition comprises a first curing agent which should typically be employed in an amount of from 25 to 75 wt. %, based on the weight of said second part: the first curing agent may preferably constitute from 50 to 75 wt. %, for example from 55 to 70 wt. % or from 60 to 70 wt. % or from 61 to 65 wt. % of said second part; alternatively, the first curing agent may preferably constitute from 25 to 60 wt. %, for example from 30 to 55 wt. % or from 30 to 45 wt. %.

These first curing agent quantities are preferred because quantity greater than 75% may lead to excess of a first curing agent and unwanted reactions may adversary affect the properties of the composition, whereas low quantities, mainly below 25% may lead to incomplete cure and therefore, poor initial adhesion properties.

In an important embodiment, the first curing agent comprises or consists of at least one free radical initiator which decomposes under the action of heat to provide free radicals. Exemplary heat-activated free-radical initiators include: peroxides, including ketone peroxides; hydroperoxides; peroxycarbonates; peracetic acids; azo compounds, such as 2,2'-azobisisobutyronitrile (AIBN) or 2,2'-azobis(2,4-dimethylpentanenitrile), 4,4'-azobis(4-cyanovaleric acid), or 1,1'-azobis (cyclohexanecarbonitrile); tetrazines; and, persulfate compounds, such as potassium persulfate. Free radical initiators that are solids at room temperature are preferred. Alternatively, or additional to that statement of preference, it is desirable that said free radical initiators have a half-life of at least 10 hours at a temperature of 60° C.

While certain peroxides—such as dialkyl and diaryl peroxides—have been disclosed as useful curing agents in inter alia U.S. Pat. No. 3,419,512 (Lees) and U.S. Pat. No. 3,479,246 (Stapleton) and indeed have utility herein, hydroperoxides also represent an important class of curing agent for the present invention. In this context, whilst hydrogen peroxide itself may be used, it is preferred to employ organic hydroperoxides. For completeness, included within the definition of hydroperoxides are materials such as organic peroxides or organic peresters which decompose or hydrolyze to form organic hydroperoxides in situ: examples of such peroxides and peresters are cyclohexyl and hydroxy-cyclohexyl peroxide and t-butyl perbenzoate, respectively.

Without intention to limit the present invention, representative hydroperoxide compounds have the general formula:

wherein: $R^p$ is a hydrocarbon group containing up to 18 carbon atoms, and preferably wherein: $R^p$ is a $C_1$-$C_{12}$ alkyl, $C_6$-$C_{18}$ aryl or $C_7$-$C_{18}$ aralkyl group.

As exemplary compounds, which may be used alone or in combination as the first curing agent, there may be mentioned: cumene hydroperoxide (CHP); para-menthane hydroperoxide; t-butyl hydroperoxide (TBH); t-butyl perbenzoate; t-butyl peracetate; t-amyl hydroperoxide; 1,2,3,4-tetramethylbutyl hydroperoxide; lauryl peroxide; benzoyl peroxide (also (known as dibenzoyl peroxide, $C_{14}H_{10}O_4$, CAS No. 94-36-0); 1,3-bis(t-butylperoxyisopropyl) benzene; diacetyl peroxide; butyl 4,4-bis (t-butylperoxy) valerate; p-chlorobenzoyl peroxide; t-butyl cumyl peroxide; di-t-butyl peroxide; dicumyl peroxide; 2,5-dimethyl-2,5-di-t-butylperoxyhexane; 2,5-dimethyl-2,5-di-t-butyl-peroxyhex-3-yne; and, 4-methyl-2,2-di-t-butylperoxypentane.

Second Curing Agent

As noted above, the second part of the composition comprises a second curing agent which should typically be employed in an amount of from 0.01 to 5 wt. %, based on the weight of said second part: the second curing agent may preferably constitute from 0.01 to 1 wt. %, for example from 0.03 to 1 wt. % or from 0.05 to 0.3 wt. % of said second part.

These second curing agent quantities are preferred because quantity greater than 5% may adversely affect debonding effect, whereas low quantities, mainly below 0.01% may lead to decrease in initial adhesion properties.

The second curing agent is included in the composition to enhance at least one of the cure speed, bond strength and bond quality of the adhesive composition.

In an important embodiment, the second curing agent comprises or consists of at least one compound which is a salt or a complex of a transition metal, which transition metal may be selected from the group consisting of Fe, Co, V, Ti, Mn, Cu, Sn, Cr, Ni, Mo, Ge, Sr, Pd, Pt, Nb, Sb, Re, Os, Ir, Pt, Au, Hg, Te, Rb and Bi and should, in particular, be selected from the group consisting of Fe, Co, V, Mn and Cu.

It has proved advantageous for the second agent to comprise or consist of at least one iron compound selected from the group consisting of: iron carboxylates; iron 1,3-dioxo complexes; ammonium-ferric-ferrocyanide [ammonium iron(3+) hexakis(cyano-C)ferrate(4-)]; and, iron dicylcopentadienyl complexes. In this regard exemplary iron carboxylates include iron lactate, iron naphthenate, iron 2-ethyl hexanoate (iron octanoate), iron formate, iron acetate, iron propionate, iron butyrate, iron pentanoate, iron hexanoate, iron heptanoate, iron nonanoate, iron decanoate, iron neodecanoate, and iron dodecanoate. Exemplary iron 1,3-dioxo complexes include iron acetoacetonate, and the iron complexes of acetyl acetone, benzoyl acetone, dibenzoyl methane and acetoacetates such as diethyl acetoacetamide, dimethyl acetoacetamide, dipropylacetoacetamide, dibutylacetoacetamide, methyl acetoacetate, ethyl acetoacetate, propyl acetoacetate and butylacetoacetate. Examples of iron dicylcopentadienyl complexes are those complexes comprising iron and two substituted or unsubstituted cyclopentadienyl ligands, wherein the optional substituents on the cyclopentadienyl ring are selected from the group consisting of $C_1$-$C_{12}$ alkyl, $C_6$-$C_{18}$ aryl, and $C_7$-$C_{18}$ aralkyl groups. A particular example of an iron dicylcopentadienyl complex is ferrocene (bis(η5-cyclopentadienyl)iron).

It is noted that both Fe(II) and Fe(III) complexes can be used. Moreover, a particular preference for the use of ferrocene as at least a part of the second curing agent may be mentioned.

As further exemplary transition metal compounds which may be used in or as the second curing agent, particular mention may be made of salts and complexes of copper, cobalt, vanadium and manganese. Herein cobalt compounds can be used as the transition metal without legislative and toxicity issues on account of the small amounts utilized. Suitable counteranions present in the salts include: halide; nitrate; sulphate; sulphonate; phosphate; phosphonate; oxide; or, carboxylate, such as lactate, 2-ethyl hexanoate, acetate, proprionate, butyrate, oxalate, laurate, oleate, linoleate, palmitate, stearate, acetyl acetonate, octanoate, nonanoate, heptanoate, neodecanoate or naphthenate.

Solubilizer

The second part of the two-part (2K) composition necessarily comprises a solubilizer which is conventionally present in an amount of from 20 to 45 wt. %, based on the weight of the second part: preferably the solubilizer constitutes from 28 to 40 wt. %, for example from 35 to 38 wt. % of said second part. The solubilizer has the function of promoting the miscibility of the electrolyte within the adhesive composition formed upon admixture of the two parts thereof: the solubilizer may or may not form part of the polymer matrix formed upon curing of the adhesive composition but does serve to facilitate ion transfer therein. The solubilizer is, as such, preferably a polar compound and should desirably be liquid at room temperature.

These solubilizer quantities are preferred because quantity greater than 45% may adversely affect adhesion and cure properties, whereas low quantities, mainly below 20% may lead the second part of the composition being solid, and therefore, hinder blending of the first and second parts.

In a first embodiment, the solubilizer comprises or consists of one or more liquid epoxy resins. Epoxy resins as used herein may include monofunctional epoxy resins, multi- or poly-functional epoxy resins, and combinations thereof. The epoxy resins may be pure compounds but equally may be mixtures of epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In certain embodiments, the monoepoxide compound conforms to Formula (I) herein below:

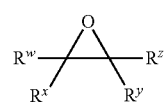

(I)

wherein: $R^w$, $R^x$, $R^y$ and $R^z$ may be the same or different and are independently
  selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^y$ and $R^z$ is not hydrogen.

It is preferred that $R^w$, $R^x$ and $R^y$ are hydrogen and $R^z$ is either a phenyl group or a $C_1$-$C_8$ alkyl group and, more preferably, a $C_1$-$C_4$ alkyl group.

Having regard to these embodiments, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and am ides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; polyalkyleneglycol based diglycidyl ethers, in particular polypropyleneglycol diglycidyl ethers; and, polycarbonate-diol based glycidyl ethers.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

Glycidyl esters of polycarboxylic acids having utility in the present invention are derived from polycarboxylic acids which contain at least two carboxylic acid groups and no other groups reactive with epoxide groups. The polycarboxylic acids can be aliphatic, cycloaliphatic, aromatic and heterocyclic. The preferred polycarboxylic acids are those which contain not more than 18 carbon atoms per carboxylic acid group of which suitable examples include but are not limited to: oxalic acid; sebacic acid; adipic acid; succinic acid; pimelic acid; suberic acid; glutaric acid; dimer and trimer acids of unsaturated fatty acids, such as dimer and trimer acids of linseed fatty acids; phthalic acid; isophthalic acid; terephthalic acid; trimellitic acid; trimesic acid; phenylene-diacetic acid; chlorendic acid; hexahydrophthalic acid, in particular hexahydroorthophthalic acid (1,2-cyclohexanedicarboxylic acid); diphenic acid; naphthalic acid; polyacid terminated esters of di-basic acids and aliphatic polyols; polymers and co-polymers of (meth)acrylic acid; and, crotonic acid.

Other suitable diepoxides which might also be mentioned include: diepoxides of double unsaturated fatty acid $C_1$-$C_{18}$ alkyl esters; butadiene diepoxide; polybutadiene diglycidyl ether; vinylcyclohexene diepoxide; and, limonene diepoxide.

And examples of preferred polyepoxide compounds include: bisphenol-A epoxy resins, such as DER™ 331, DER™ 332, DER™ 383, JER™ 828 and Epotec YD 128; bisphenol-F epoxy resins, such as DER™ 354; bisphenol-NF epoxy resin blends, such as DER™ 353; aliphatic glycidyl ethers, such as DER™ 736; polypropylene glycol diglycidyl ethers, such as DER™ 732; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; sorbitol glycidyl ether, such as ERISYS™ GE-60; and, bis(2,3-epoxypropyl)cyclohexane-1,2-dicarboxylate, available as Lapox Arch-11. A particular preference for solubilizer comprising or consisting of bisphenol-A epoxy resin is noted.

Where the solubilizer of the second part of the composition is based on one or more epoxy resins, the present invention does not preclude the solubilizer from further comprising one or more cyclic compounds selected from the group consisting of: oxetanes; cyclic carbonates; cyclic anhydrides; and, lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840. However, such further cyclic compounds should constitute less than 20 wt. %, preferably less than 10 wt. % or less than 5 wt. %, based on the total weight of the epoxide compounds.

In another embodiment, which is not intended to be mutually exclusive of that given above, the solubilizer of the second part comprises at least one polymer which is liquid at room temperature and which is selected from the group consisting of: polyphosphazenes; polymethylenesulfides; polyoxyalkylene glycols; and, polyethylene imines. A preference for polyoxy($C_2$-$C_3$)alkylene glycols having a weight average molecular weight of from 350 to 10000 g/mol, for example 500 to 5000 g/mol, may be noted.

Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives—which independently of one another may be included in single parts or both parts of a two (2K) part composition—are: plasticizers; stabilizers including UV stabilizers; antioxidants; tougheners; electrically conductive fillers; electrically non-conductive fillers; reactive diluents; drying agents; adhesion promoters; fungicides; flame retardants; rheological adjuvants; colour pigments or colour pastes; and/or optionally also, to a small extent, non-reactive diluents.

Such adjuvants and additives can be used in such combination and proportions as desired, provided they do not adversely affect the nature and essential properties of the composition. While exceptions may exist in some cases, these adjuvants and additives should not in toto comprise more than 50 wt. % of the total composition and preferably should not comprise more than 20 wt. % of the composition.

For completeness, it is noted that, in general, adjunct materials and additives which contain reactive groups will be blended into the appropriate part of the two (2K) part composition to ensure the storage stability thereof. Unreactive materials may be formulated into either or both of the two parts.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched $C_4$-$C_{16}$ alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

Those compositions of the present invention may optionally contain a toughening rubber in the form of core-shell particles dispersed in the epoxy resin matrix. The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower. The polymer of the shell is non-elastomeric, thermoplastic or thermoset polymer having a glass transition temperature ($T_g$) of greater than room temperature, preferably greater than 30° C. and more preferably greater than 50° C.

Without intention to limit the invention, the core may be comprised of: a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly without intention to limit the present invention, the shell may be comprised of a polymer or copolymer of one or more monomers selected from: (meth)acrylates, such as methyl methacrylate; vinyl aromatic monomers, such as styrene; vinyl cyanides, such as acrylonitrile; unsaturated acids and anhydrides, such as acrylic acid; and, (meth) acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that any included core-shell rubber particles have an average particle size (d50) of from 10 nm to 300 nm, for example from 50 nm to 250 nm: said particle size refers to the diameter or largest dimension of a particle in a distribution of particles and is measured via dynamic light scattering. For completeness, the present application does not preclude the presence of two or more types of core shell rubber (CSR) particles with different particle size distributions in the composition to provide a balance of key properties of the resultant cured product, including shear strength, peel strength and resin fracture toughness.

The core-shell rubber may be selected from commercially available products, examples of which include: Paraloid EXL 2650A, EXL 2655 and EXL2691 A, available from The Dow Chemical Company; Clearstrength® XT100, available from Arkema Inc.; the Kane Ace® MX series available from Kaneka Corporation, and in particular MX 120, MX 125, MX 130, MX 136, MX 551, MX553; and, METABLEN SX-006 available from Mitsubishi Rayon.

The core shell rubber particles should be included in the composition in an amount of from 0 to 15 wt. %, for example from in an amount up to 10 wt. % based on the total weight of the composition.

As noted, the compositions according to the present invention can additionally contain conductive fillers. Broadly, there is no particular intention to limit the shape of the particles employed as conductive fillers: particles that are acicular, spherical, ellipsoidal, cylindrical, bead-like, cubic or platelet-like may be used alone or in combination. Moreover, it is envisaged that agglomerates of more than one particle type may be used. Equally, there is no particular intention to limit the size of the particles employed as conductive fillers. However, such conductive fillers will conventionally have an average volume particle size, as measured by laser diffraction/scattering methods, of from 1 to 500 μm, for example from 1 to 200 μm.

Exemplary conductive fillers include, but are not limited to: silver; copper; gold; palladium; platinum; nickel; gold or silver-coated nickel; carbon black; carbon fibre; graphite; aluminum; indium tin oxide; silver coated copper; silver coated aluminum; metallic coated glass spheres; metallic coated filler; metallic coated polymers; silver coated fibre; silver coated spheres; antimony doped tin oxide; conductive nanospheres; nano silver; nano aluminum; nano copper; nano nickel; carbon nanotubes; and, mixtures thereof. The use of particulate silver and/or carbon black as the conductive filler is preferred.

In certain important embodiments, the electrically conductive fillers should be included in the composition in an amount of from 0 to 10 wt. %, for example in an amount up to 5 wt. % based on the total weight of the composition.

The presence of non-conductive fillers in the composition is not precluded: aside from moderating the viscosity of the composition, such fillers may be added as desired to reduce the coefficient of thermal expansion of the adhesive. Broadly, there is no particular intention to limit the shape of the particles employed as non-conductive fillers: particles that are acicular, spherical, ellipsoidal, cylindrical, bead-like, cubic or platelet-like may be used alone or in combination. Moreover, it is envisaged that agglomerates of more than one particle type may be used. Equally, there is no particular intention to limit the size of the particles employed as non-conductive fillers. However, such non-conductive fillers will conventionally have an average volume particle size, as measured by laser diffraction/scattering methods, of from 0.1 to 1500 μm, for example from 1 to 1000 μm or from 1 to 500 μm.

Exemplary non-conductive fillers include but are not limited to chalk, lime powder, precipitated and/or pyrogenic silicic acid, zeolites, bentonites, magnesium carbonate, diatomite, alumina, clay, talc, sand, quartz, flint, mica, glass powder, and other ground mineral substances. Short fibres such as glass fibres, glass filament, polyacrylonitrile, carbon fibres, polyethylene fibres can also be added.

The pyrogenic and/or precipitated silicic acids advantageously have a BET surface area from 10 to 90 $m^2/g$. When they are used, they do not cause any additional increase in the viscosity of the composition according to the present invention but do contribute to strengthening the cured composition.

It is likewise conceivable to use pyrogenic and/or precipitated silicic acids having a higher BET surface area, advantageously from 100 to 250 m²/g as a filler: because of the greater BET surface area, the effect of strengthening the cured composition is achieved with a smaller proportion by weight of silicic acid.

Also suitable as non-conductive fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 µm or less, preferably between 100 µm and 200 µm.

Non-conductive fillers which impart thixotropy to the composition may be preferred for many applications: such fillers are also described as rheological adjuvants, e.g. hydrogenated castor oil, fatty acid amides, or swellable plastics such as PVC.

The total amount of fillers—both electrically conductive and non-conductive—present in the compositions of the present invention will preferably be from 0 to 20 wt. %, and more preferably from 0 to 10 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

In order to enhance shelf life even further, it is often advisable to further stabilize the compositions of the present invention with respect to moisture penetration through using drying agents. A need also occasionally exists to lower the viscosity of an adhesive composition according to the present invention for specific applications, by using reactive diluent(s). The total amount of reactive diluents present will typically be from 0 to 15 wt. %, for example from 0 to 5 wt. %, based on the total weight of the composition.

The presence of solvents and non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute in toto less than 10 wt. %, in particular less than 5 wt. % or less than 2 wt. %, based on the total weight of the composition.

Illustrative Embodiment of the Two-Part (2K) Composition

In an exemplary embodiment of the present invention, the two-part (2K) adhesive composition comprises:
 a first part comprising, based on the weight of said first part:
  from 40 to 75 wt. %, preferably from 47 to 68 wt. %, of (meth)acrylate monomer, wherein said (meth)acrylate monomer comprises at least one $C_1$-$C_6$ alkyl ester of (meth)acrylic acid;
  from 6 to 16 wt. %, preferably from 10 to 13 wt. %, of co-polymerizable acid, wherein said co-polymerizable acid is selected from the group consisting of methacrylic acid, acrylic acid, itaconic acid, maleic acid, aconitic acid, crotonic acid, fumaric acid and mixtures thereof; and,
  from 4 to 23 wt. %, preferably from 5 to 20 wt. % of electrolyte, wherein said electrolyte is selected from 1-ethyl-3-methylimidazolium methansulfonate, 1-ethyl-3-methylimidazolium methyl sulfate and mixtures thereof; and,
 a second part comprising, based on the weight of said second part:
  from 55 to 70 wt. % preferably from 61 to 65 wt. % or from 30 to 55 wt. %, preferably from 30 to 45 wt. %, of a first curing agent which comprises or consists of at least one free radical initiator which decomposes under the action of heat to provide free radicals;
  from 0.03 to 1 wt. %, preferably from 0.05 to 0.3 wt. % of a second curing agent which consists of at least one compound which is a salt or a complex of a transition metal selected from the group consisting of Fe, Co, V, Mn and Cu; and,
  from 28 to 40 wt. %, preferably from 35 to 38 wt. % of a solubilizer,
wherein said first part and/or said second part further comprise electrically conductive particles selected from the group consisting of carbon black, silver and mixtures thereof.

It is preferred in this embodiment that the first curing agent is a peroxide or hydroperoxide compound selected from the group consisting of tert-butyl peroxide, tert-butyl perbenzoate, cumene hydroperoxide, tert-butyl peroxybenzoate, diacetyl peroxide, benzoyl peroxide, tert-butyl peracetate, lauryl peroxide and mixtures thereof: a particular preference for benzoyl peroxide is noted. Independently of or additional to this statement of preference for the first curing agent, the second curing agent preferably comprises of consists of at least one iron-based compound selected from the group consisting of ferrocene, iron(II) acetylacetonate, ammonium iron (III)hexakis (cyano-C)ferrat: a particular preference for ferrocene is noted.

Methods and Applications

To form the defined two part (2K) curable compositions, the reactive parts are brought together and mixed in such a manner as to induce the hardening thereof. The reactive compounds should be mixed under sufficient shear forces to yield a homogeneous mixture. It is considered that this can be achieved without special conditions or special equipment. That said, suitable mixing devices might include: static mixing devices; magnetic stir bar apparatuses; wire whisk devices; augers; batch mixers; planetary mixers; C.W. Brabender or Banburry® style mixers; and, high shear mixers, such as blade-style blenders and rotary impellers.

For small-scale applications in which volumes of less than 2 litres will generally be used, the preferred packaging for the two part (2K) compositions will be side-by-side double cartridges or coaxial cartridges, in which two tubular chambers—typically of equal volume—are arranged alongside one another or inside one another and are sealed with pistons: the driving of these pistons allows the parts to be extruded from the cartridge, advantageously through a closely mounted static or dynamic mixer. For larger volume applications, the two parts of the composition may advantageously be stored in drums or pails: in this case the two parts are extruded via hydraulic presses, in particular by way of follower plates, and are supplied via pipelines to a mixing apparatus which can ensure fine and highly homogeneous mixing of the two parts. In any event, for any package it is important that the parts be disposed with an airtight and moisture-tight seal, so that both parts can be stored for a long time, ideally for 12 months or longer.

Non-limiting examples of two-part dispensing apparatuses and methods that may be suitable for the present invention include those described in U.S. Pat. Nos. 6,129,244 and 8,313,006.

Depending upon the desired properties of the cured composition, the two parts will conventionally be mixed at a ratio by volume of Part A:Part B of from 20:1 to 1:10, for example 10:1 to 1:10, for example 5:1 to 1:5, or for example from 2:1 to 1:2 or from 1.5:1 to 1:1.5. The latter range includes a ratio by volume of Part A:Part B of from 1:1 which, in itself, presents one preferred embodiment of the present invention. Another preferred embodiment has a ratio by volume of Part A:Part B of 10:1. In some embodiments, a ratio by volume of Part A:Part B may be 1:12. In one highly preferred embodiment, a ratio by volume of Part A:Part B of from 12:1 to 6.5:1.

Where applicable, the two (2K) part curable compositions should broadly be formulated to exhibit an initial viscosity—determined immediately after mixing, for example, up to two minutes after mixing—of less than 200000 mPa·s, for instance less than 100000 mPa·s, at 25° C. Independently of or additional to said viscosity characteristics, the two (2K) part composition should be formulated to be bubble (foam) free upon mixing and subsequent curing.

In accordance with the broadest process aspects of the present invention, the above described compositions are applied to the material layer(s) and then cured in situ. Prior to applying the compositions, it is often advisable to pre-treat the relevant surfaces to remove foreign matter therefrom: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

The compositions are then applied to the preferably pre-treated surfaces of the substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray.

As noted above, the present invention provides a bonded structure comprising: a first material layer having an electrically conductive surface; and, a second material layer having an electrically conductive surface, wherein the cured debondable two-part (2K) adhesive composition as defined hereinabove and in the appended claims is disposed between said first and second material layers. To produce such a structure, the adhesive composition may be applied to at least one internal surface of the first and/or second material layer and the two layers then subsequently contacted, such that the curable and debondable adhesive composition according to the present invention is interposed between the two layers.

It is recommended that the compositions be applied to a surface at a wet film thickness of from 10 to 500 µm. The application of thinner layers within this range is more economical and provides for a reduced likelihood of deleterious thick cured regions. However, great control must be exercised in applying thinner coatings or layers so as to avoid the formation of discontinuous cured films.

The curing of the applied compositions of the invention typically occurs at temperatures in the range of from 40° C. to 200° C., preferably from 50° C. to 175° C., and in particular from 75° C. to 175° C. The temperature that is suitable depends on the specific compounds present and the desired curing rate and can be determined in the individual case by the skilled artisan, using simple preliminary tests if necessary. Of course, curing at lower temperatures within the afore mentioned ranges is advantageous as it obviates the requirement to substantially heat or cool the mixture from the usually prevailing ambient temperature. Where applicable, however, the temperature of the mixture formed from the respective parts of a two (2K) part composition may be raised above the mixing temperature and/or the application temperature using conventional means including microwave induction.

The present invention will be described with reference to the appended drawings in which.

Figure 6:
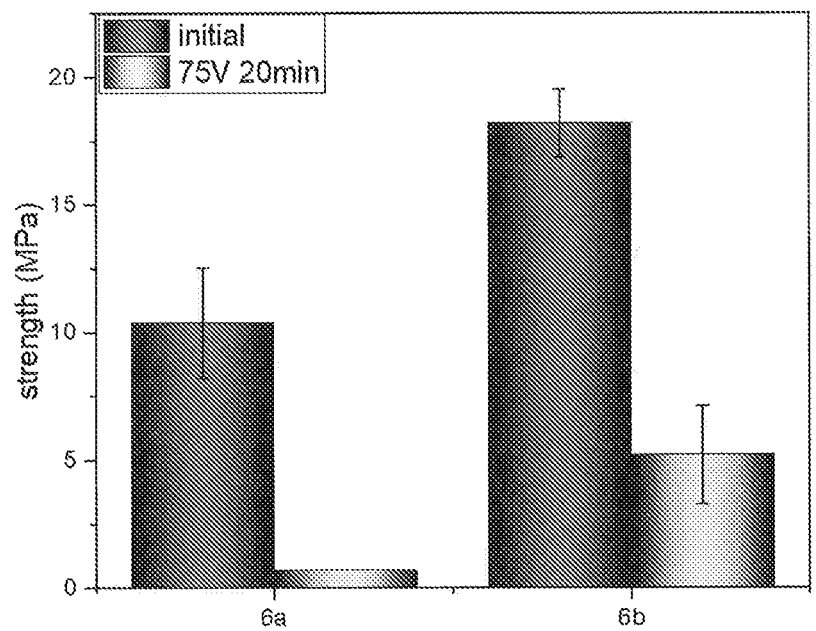

FIG. 6 a illustrates bar chart of a storage period and subsequent to the application of a constant potential of 75V across the adhesive layer for a duration of 20 minutes, as captured in Table 14.

Figure 7:
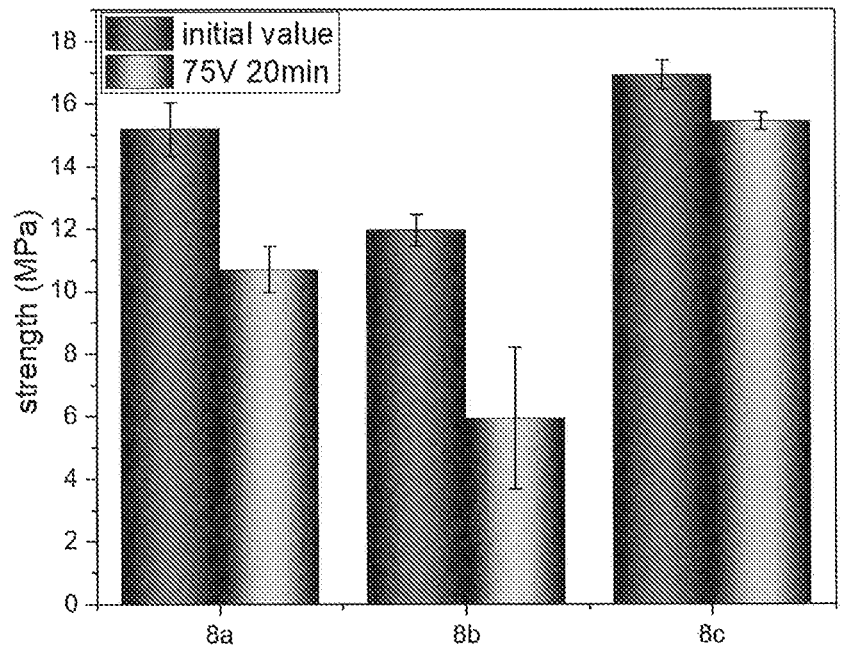

FIG. 7 illustrates a bar chart of a storage period and subsequent to the application of a constant potential of 75V across the adhesive layer for a duration of 20 minutes, as captured in Table 17.

Figure 8:
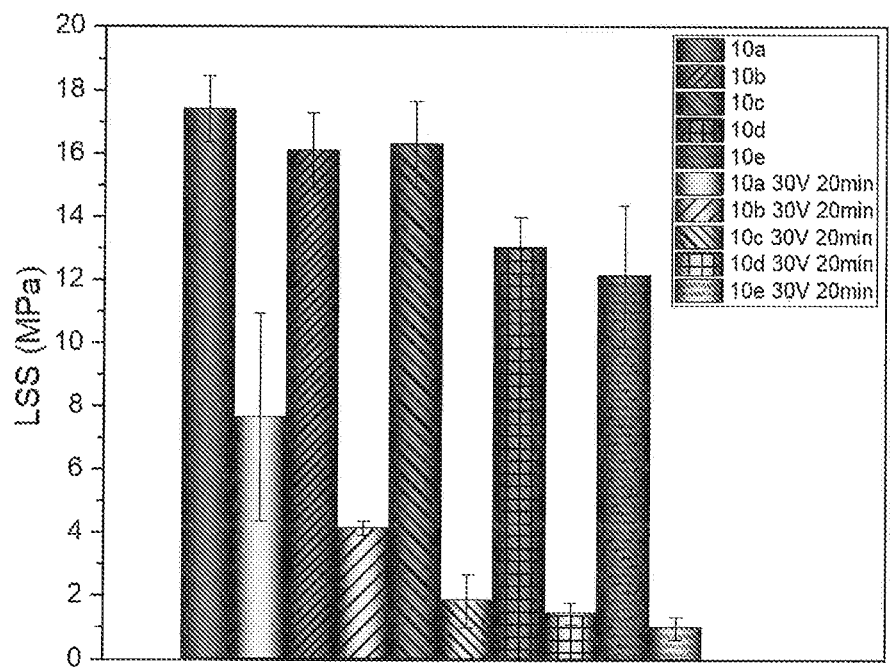

FIG. 8 illustrates a bar chart of a storage period and subsequent to the application of a constant potential of 30V across the adhesive layer for a duration of 20 minutes, as captured in Table 21.

Figure 9:
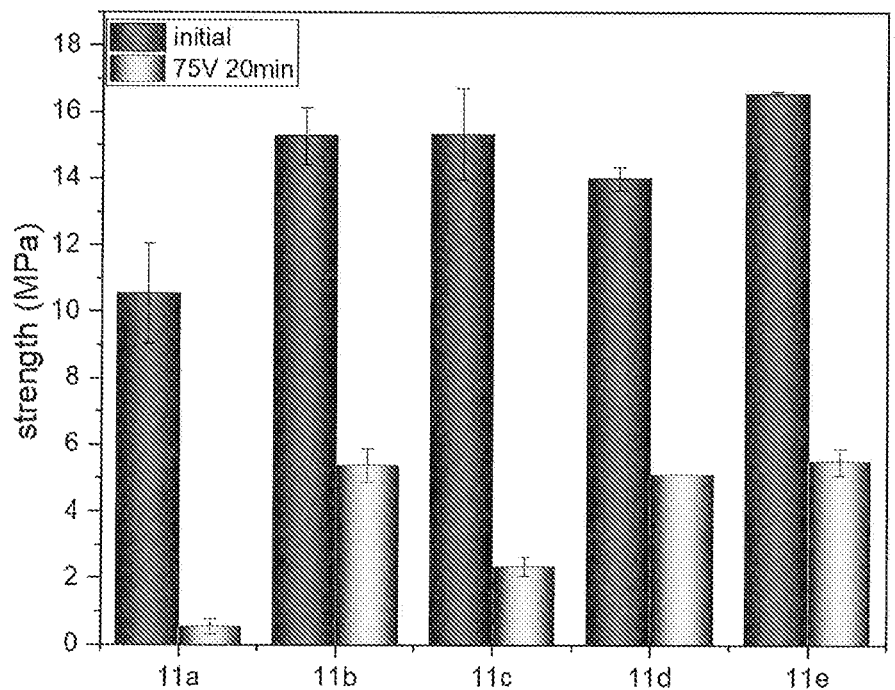

FIG. 9 illustrates a bar chart of a storage period and subsequent to the application of a constant potential of 75 V 20 minutes, as captured in Table 24.

Figure 1A:
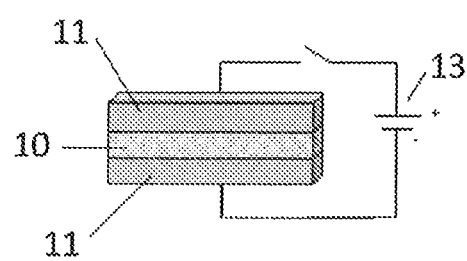
FIG. 1a illustrates a bonded structure in accordance with a first embodiment of the present invention.
Figure 1B:
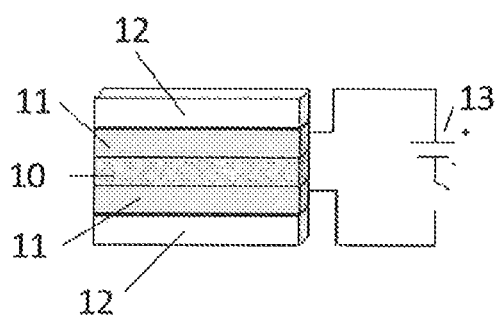
FIG. 1b illustrates a bonded structure in accordance with a second embodiment of the present invention.

As shown in FIG. 1a appended hereto, a bonded structure is provided in which a layer of cured adhesive (10) is disposed between two conductive substrates (11). A layer of non-conductive material (12) may be disposed on the conductive substrates (11) to form the more complex bonded structure as depicted in FIG. 1b. Each layer of conductive substrate (11) is in electrical contact with an electrical power source (13) which may be a battery or an AC-driven source of direct current (DC). The positive and negative terminals of that power source (13) are shown in one fixed position but the skilled artisan will of course recognize that the polarity of the system can be reversed.

The two conductive substrates (11) are shown in the form of a layer which may be constituted by inter alia: a metallic film; a metallic sheet; a metallic mesh or grid; deposited metal particles; a resinous material which is rendered conductive by virtue of conductive elements disposed therein; or, a conducting oxide layer. As exemplary conductive elements there may be mentioned silver filaments, single-walled carbon nanotubes and multi-walled carbon nanotubes. As exemplary conducting oxides there may be mentioned: doped indium oxides, such as indium tin oxide (ITO); doped zinc oxide; antimony tin oxide; cadmium stannate; and, zinc stannate. The selection of the conductive material aside, the skilled artisan will recognize that the efficacy of the debonding operation may be diminished where the conductive substrates (11) are in the form of a grid or mesh which offers limited contact with the layer of cured adhesive (10).

When an electrical voltage is applied between each conductive substrate (11), current is supplied to the adhesive composition (10) disposed there between. This induces electrochemical reactions at the interface of the substrates (11) and the adhesive composition, which electrochemical reactions are understood as oxidative at the positively charged or anodic interface and reductive at the negatively charged or cathodic interface. The reactions are considered to weaken the adhesive bond between the substrates allowing the easy removal of the debondable composition from the substrate.

Figure 2A:
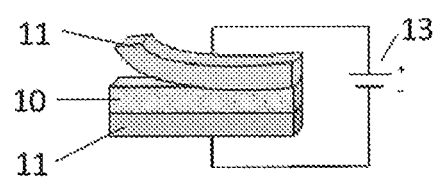
FIG. 2a illustrates the initial debonding of the structure of the first embodiment upon passage of a current across that structure.
Figure 2B:
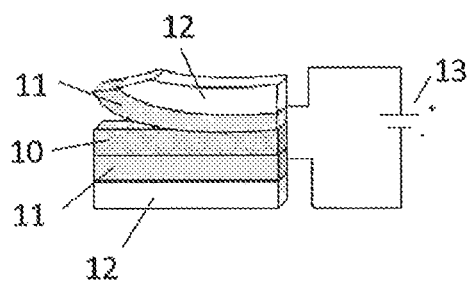
FIG. 2b illustrates the initial debonding of the structure of the second embodiment upon passage of a current across that structure.

As depicted in FIGS. 2a and 2b, the debonding occurs at the positive interface, that interface between the adhesive composition (10) and the electrically conductive surface (11) that is in electrical contact with the positive electrode. By reversing current direction prior to separation of the substrates, the adhesive bond may be weakened at both substrate interfaces.

It is however noted that the composition of the adhesive layer (10) may be moderated so that debonding occurs at either the positive or negative interface or simultaneously from both. For some embodiments a voltage applied across both surfaces so as to form an anodic interface and a cathodic interface will cause debonding to occur simultaneously at both the anodic and cathodic adhesive/substrate interfaces. In an alternative embodiment, reversed polarity may be used to simultaneously disbond both substrate/adhesive interfaces if the composition does not respond at both interfaces to direct current. The current can be applied with any suitable waveform, provided that sufficient total time at each polarity is allowed for debonding to occur. Sinusoidal, rectangular and triangular waveforms might be appropriate in this regard and may be applied from a controlled voltage or a controlled current source.

Without intention to limit the present invention, it is considered that the debonding operation may be performed effectively where at least one and preferably both of the following conditions are instigated: a) an applied voltage of from 0.5 to 100 V; and, b) the voltage being applied for a duration of from 1 second to 60 minutes. Where the release of the conductive substrate from the cured adhesive is to be facilitated by the application of a force—exerted via a weight or a spring, for instance—the potential might only need to be applied for the order of seconds. In some embodiments potential of 5V for a duration of 10 minutes is sufficient to have a debonding effect, whereas in some embodiments, potential of 3.5V for a duration of 30 minutes is sufficient.

It is desired that after the debonding, the adhesive composition is solely on a first substrate or a second substrate, meaning that one of the substrates is substantially free of adhesive.

The following examples are illustrative of the present invention and are not intended to limit the scope of the invention in any way.

EXAMPLES

The following materials were employed in the Examples:

Aerosil 200: Hydrophilic fumed silica, available from Evonik Industries.

Clearstrength® XT100: Core-shell toughening agent (methylmethacrylate-butadiene-styrene, MBS) available from Arkema Inc.

1-Ethyl-3-methylimidazolium methansulfonate: Available from TCI America Inc.

Ferrocene: bis(η5-cyclopentadienyl)iron, available from Sigma Aldrich.

DER 331: Bisphenol-A epoxy resin, available from Dow Chemical.

Benzoyl peroxide (75%): Powder, available from Arkema Inc.

Example 1

Parts (A) and (B) of a composition 1 were prepared in accordance with Table 1 herein below.

TABLE 1

| | Part A | |
|---|---|---|
| Component | Weight [g] | % by weight of stated part |
| Methylmethacrylate | 5.50 | 54.98% |
| Methacrylic acid | 1.20 | 11.96% |
| 1-Ethyl-3-methylimidazolium methane sulfonate | 1.70 | 17.00% |

TABLE 1-continued

| | Weight [g] | % by weight of stated part |
|---|---|---|
| Clearstrength XT 100 | 1.42 | 14.17% |
| Aerosil 200 | 0.19 | 1.89% |
| Total | 10.0 | 100.00% |

Part B

| Part B | Weight [g] | % by weight of stated part |
|---|---|---|
| Ferrocene | 0.02 | 0.17% |
| D.E.R. 331 | 3.61 | 36.36% |
| Benzoyl peroxide | 6.31 | 63.47% |
| Total | 10 | 100% |

The parts (A, B) were loaded in an equal amount by weight into separate compartments of a 50 g cartridge and sealed at both ends. The cartridge was then loaded into a cartridge-gun and a mixing tip was installed on the front end. By application of constant pressure on the trigger, the two parts were pushed into the mixing tip to ensure sufficient mixing before application to the stated substrate.

The substrates were copper (thickness 1 mm), aluminium (AA6016, thickness 1.25 mm) and stainless steel (1.4301, thickness 1.5 mm) each with a thickness of Substrates were cut into 2.5 cm×10 cm (1"×4") in size for tensile testing.

Tensile lap shear (TLS) test was performed according to test method described on page 5.

The applied two-part (2K) adhesive compositions were cured in the overlapping region by the application of a temperature of 100° C. for 30 minutes. Subsequently, the samples were stored at 25° C. with 20% humidity in a climate chamber.

For each substrate, tensile lap shear strength was investigated both after said storage period and subsequent to the application of a constant potential of 75V across the adhesive layer for a duration of 1 hour. The results are documented in Table 2 herein below.

TABLE 2

| Substrate | Initial Bond Strength (MPa) | Bond Strength after 75 V, 1 hour (MPa) |
|---|---|---|
| Copper | 2.5 (±0.13) | 0.95 (±0.21) |
| Aluminium | 15.99 (±1.16) | 2.08 (±0.63) |
| Stainless Steel | 17.31 (±3.31) | 0.06 (±0.03) |

Figure 3A:
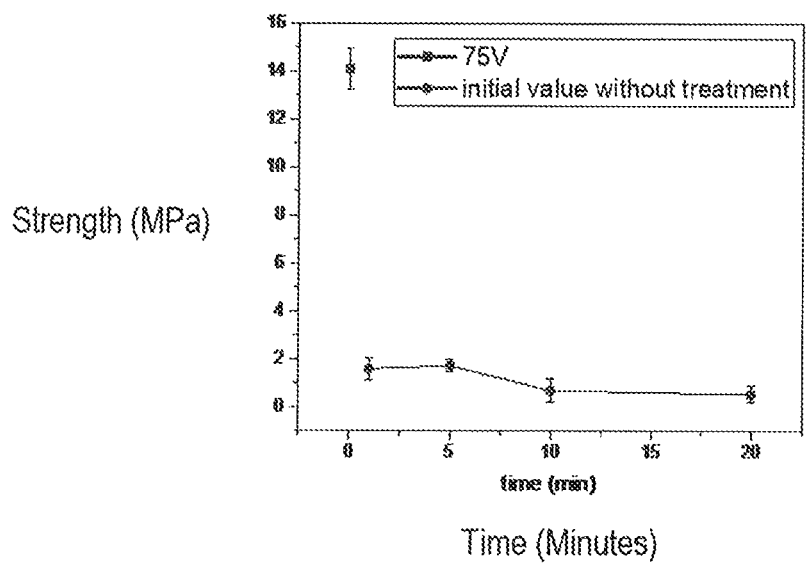
FIGS. 3a and 3b illustrate the results of lap shear strength testing of stainless steel substrates bonded with a cured adhesive composition in accordance with an embodiment of the present invention.
Figure 3B:
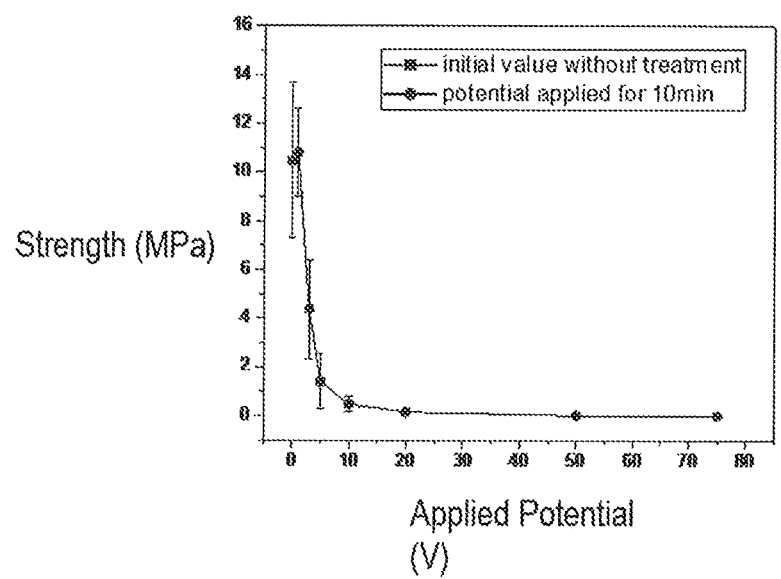

For the adhesively bonded stainless steel substrate, lap shear strength (MPa) was investigated under two conditions: a) over a period of 20 minutes applying a constant potential (75 V) across the overlapping bonded area; and, b) applying different potentials across the overlapping bonded region for a fixed period of time (10 minutes). The results of these investigations are given in FIGS. 3a and 3b appended hereto.

Figure 4A:
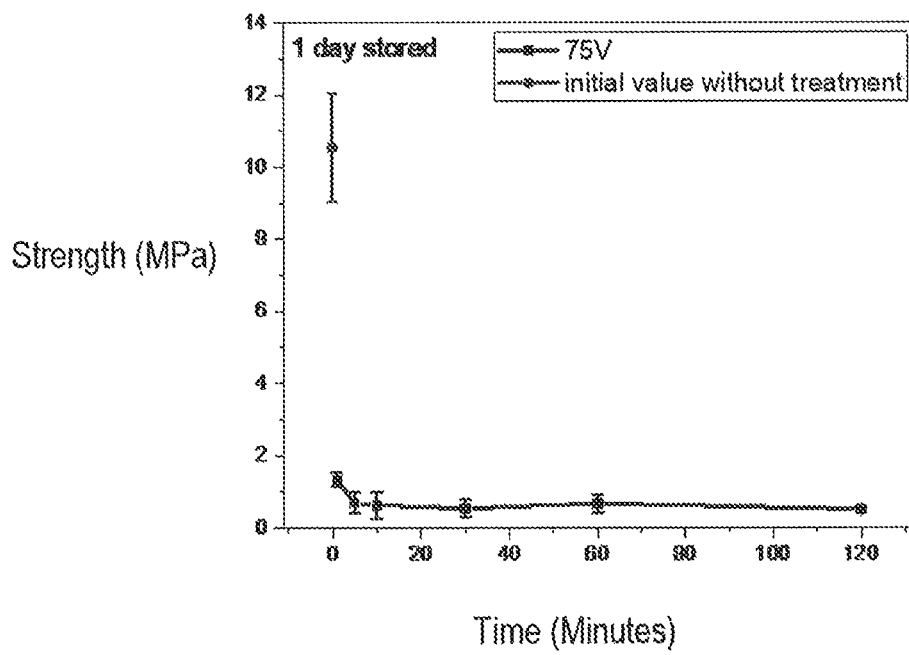
FIGS. 4a and 4b illustrate the results of lap shear strength testing of aluminium substrates bonded with a cured adhesive composition in accordance with an embodiment of the present invention.
Figure 4B:
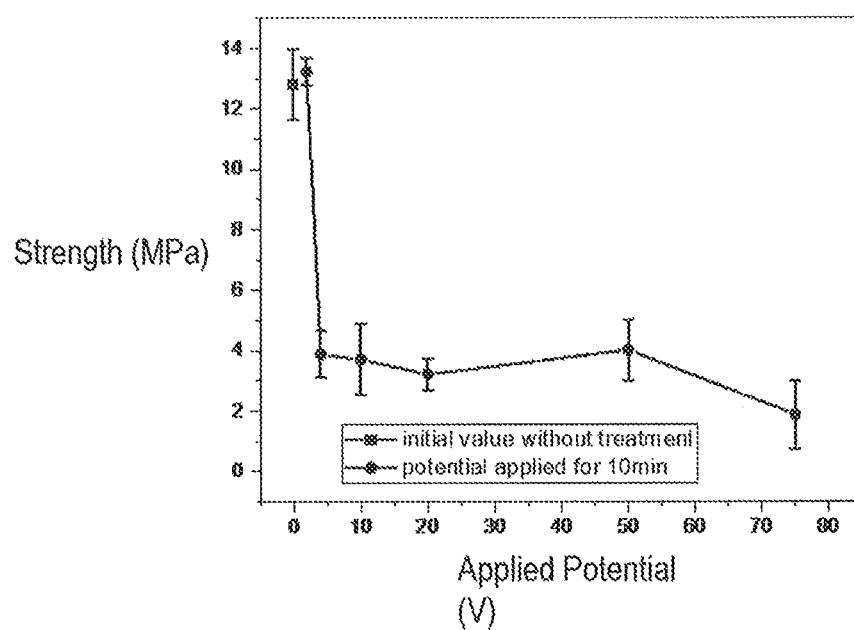

For the adhesively bonded aluminium substrate, lap shear strength (MPa) was investigated under two conditions: a) over a period of 20 minutes applying a constant potential (75 V) across the overlapping bonded area; and, b) applying different potentials across the overlapping bonded region for a fixed period of time (10 minutes). The results of these investigations are given in FIGS. 4a and 4b appended hereto.

Example 2

Parts (A) and (B) of a composition 2 were prepared in accordance with Table 3 herein below. Composition 2 was prepared and tested according to the methods described in example 1.

TABLE 3

Part A

| Component | Weight [g] | % by weight of stated part |
|---|---|---|
| Methylmethacrylate | 5.50 | 54.98% |
| Methacrylic acid | 1.20 | 11.96% |
| 1-Ethyl-3-methylimidazolium methyl sulphate | 1.70 | 17.00% |
| Clearstrength XT 100 | 1.42 | 14.17% |
| Aerosil 200 | 0.19 | 1.89% |
| Total | 10.0 | 100.00% |

Part B

| Part B | Weight [g] | % by weight of stated part |
|---|---|---|
| Ferrocene | 0.02 | 0.17% |
| D.E.R. 331 | 3.61 | 36.36% |
| Benzoyl peroxide | 6.31 | 63.47% |
| Total | 10 | 100% |

For each substrate, tensile lap shear strength was investigated both after said storage period and subsequent to the application of a constant potential of 75V across the adhesive layer for a duration of 1 hour. The results are documented in Table 4 herein below.

TABLE 4

| Substrate | Initial Bond Strength (MPa) | Bond Strength after 75 V, 1 hour (MPa) |
|---|---|---|
| Aluminium | 13.96 (±0.65) | 2.26 (±0.42) |
| Stainless Steel | 20.81 (±0.65) | 0.54 (±0.1) |

Example 3

Parts (A) and (B) of a composition 3 were prepared in accordance with Table 5 herein below. Composition 3 was prepared and tested according to the methods described in example 1.

TABLE 5

Part A

| Component | Weight [g] | % by weight of stated part |
|---|---|---|
| Methylmethacrylate | 5.63 | 56.32% |
| Methacrylic acid | 1.22 | 12.20% |
| 1-Ethyl-3-methylimidazolium methane sulfonate | 1.00 | 10.00% |
| Clearstrength XT 100 | 1.46 | 14.56% |
| Aerosil 200 | 0.19 | 1.92% |
| Silver SF7-AT | 0.50 | 5.00% |
| Total | 10.0 | 100.00% |

TABLE 5-continued

| Part B | Part B Weight [g] | % by weight of stated part |
|---|---|---|
| Ferrocene | 0.02 | 0.17% |
| D.E.R. 331 | 3.61 | 36.36% |
| Benzoyl peroxide | 6.31 | 63.47% |
| Total | 10 | 100% |

For a substrate, tensile lap shear strength was investigated both after said storage period and subsequent to the application of a constant potential of 75V across the adhesive layer for a duration of 1 hour. The results are documented in Table 6 herein below.

TABLE 6

| Substrate | Initial Bond Strength (MPa) | Bond Strength after 75 V, 1 hour (MPa) |
|---|---|---|
| Aluminium | 11.94 (±0.5) | 5.94(±) |

Example 4

Parts (A) and (B) of a composition 4 were prepared in accordance with Table 7 herein below. Composition 4 was prepared and tested according to the methods described in example 1.

TABLE 7

| Component | Part A Weight [g] | % by weight of stated part |
|---|---|---|
| Methylmethacrylate | 5.50 | 54.98 |
| Methacrylic acid | 1.20 | 11.96 |
| 1-Ethyl-3-methylimidazolium methane sulfonate | 1.70 | 17.00 |
| Clearstrength XT 100 | 1.42 | 14.17 |
| Aerosil 200 | 0.19 | 1.89 |
| Total | 10.0 | 100.00 |

| Part B | Part B Weight [g] | % by weight of stated part |
|---|---|---|
| saccharin | 3.64 | 1.41 |
| Cumene hydroperoxide | 6.35 | 83.55 |
| Benzoyl peroxide | 0.02 | 0.20 |
| Hydrin C200XL | 1.50 | 15.00 |
| Total | 10 | 100% |

For each substrate, tensile lap shear strength was investigated both after said storage period and subsequent to the application of a constant potential of 75V across the adhesive layer for a duration of 1 hour. The results are documented in Table 8 herein below.

TABLE 8

| Substrate | Initial Bond Strength (MPa) | Bond Strength after 75 V, 1 hour (MPa) |
|---|---|---|
| Aluminium | 4.47 (±1.09) | 0.044(±) |

Example 5

Parts (A) and (B) of a composition 5 were prepared in accordance with Table 9 herein below. Composition 5 was prepared and tested according to the methods described in example 1.

TABLE 9

| Component | Part A Weight [g] | % by weight of stated part |
|---|---|---|
| Methylmethacrylate | 5.50 | 54.98% |
| Methacrylic acid | 1.20 | 11.96% |
| 1-Ethyl-3-methylimidazolium methane sulfonate | 1.70 | 17.00% |
| Clearstrength XT 100 | 1.42 | 14.17% |
| Aerosil 200 | 0.19 | 1.89% |
| Total | 10.0 | 100.00% |

| Part B | Part B Weight [g] | % by weight of stated part |
|---|---|---|
| Copper(II)acetylacetonate | 0.09 | 0.17% |
| D.E.R. 331 | 3.61 | 36.36% |
| Benzoyl peroxide | 6.31 | 63.47% |
| Total | 10 | 100% |

For each substrate, tensile lap shear strength was investigated both after said storage period and subsequent to the application of a constant potential of 75V across the adhesive layer for a duration of 1 hour. The results are documented in Table 10 herein below.

TABLE 10

| Substrate | Initial Bond Strength (MPa) | Bond Strength after 75 V, 1 hour (MPa) |
|---|---|---|
| Aluminium | 14.58 (±0.59) | 3.86 (±0.63) |

In view of the foregoing description and examples, it will be apparent to those skilled in the art that equivalent modifications thereof can be made without departing from the scope of the claims.

Example 6

Stability test was conducted for the composition of example 1. For this test, normal lap shear samples were prepared and cured at 100° C. for 30 min. Aluminium and steel substrates were used. Subsequently, the samples were stored at 25° C. with 20% humidity in a climate chamber. The lap shear was measured after one day, seven days, 14 days, 28 days, 60 days and 90 days. The results are documented in Table 11 and Table 12 herein below.

TABLE 11

| Aluminium | Initial Bond Strength (MPa) | Bond Strength after 75 V, 1 hour (MPa) |
|---|---|---|
| 1 day | 13.87 +/- 1.49 | 2.1 +/- 0.78 |
| 7 days | 14.26 +/- 0.35 | 2 +/- 0.37 |
| 14 days | 15.5 +/- 1.16 | 2.74 +/- 1.05 |
| 28 days | 15.99 +/- 1.16 | 2.44 +/- 0.96 |
| 60 days | 15.69 +/- 0.9 | 1.93 +/- 0.93 |

TABLE 12

| Stainless steel | Initial Bond Strength (MPa) | Bond Strength after 75 V, 1 hour (MPa) |
|---|---|---|
| 1 day | 15.74 +/- 1.27 | 0.2 |
| 7 days | 13.34 +/- 3.31 | 0.1 +/- 0.11 |
| 14 days | 14.42 +/- 2.77 | 0.08 +/- 0.11 |
| 28 days | 18.39 +/- 2.71 | 0.046 +/- 0.07 |
| 60 days | 12.76 +/- 0.74 | 0.08 +/- 0.01 |
| 90 days | 17.61 +/- 3.39 | 0 |

Figure 5A:
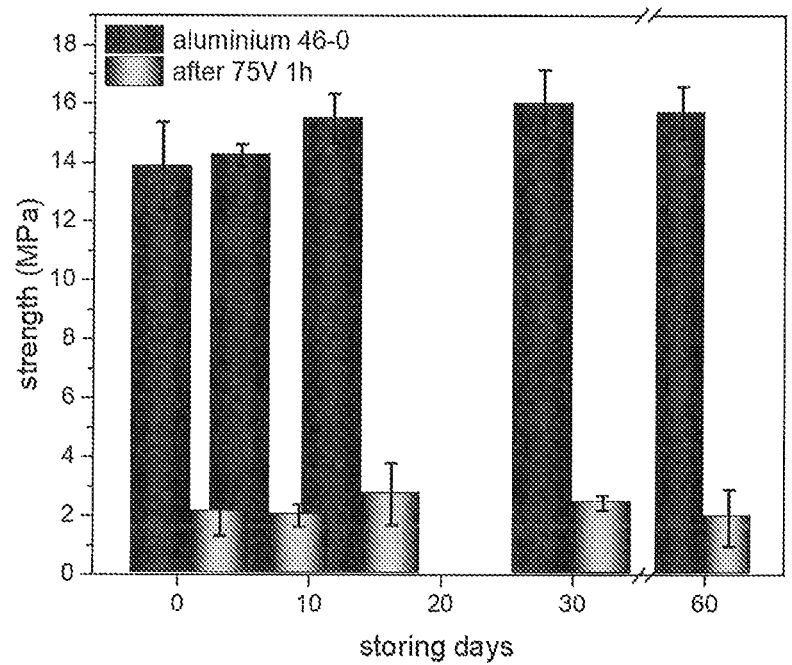
FIGS. 5a and 5b illustrate the stability over time results.
Figure 5B:
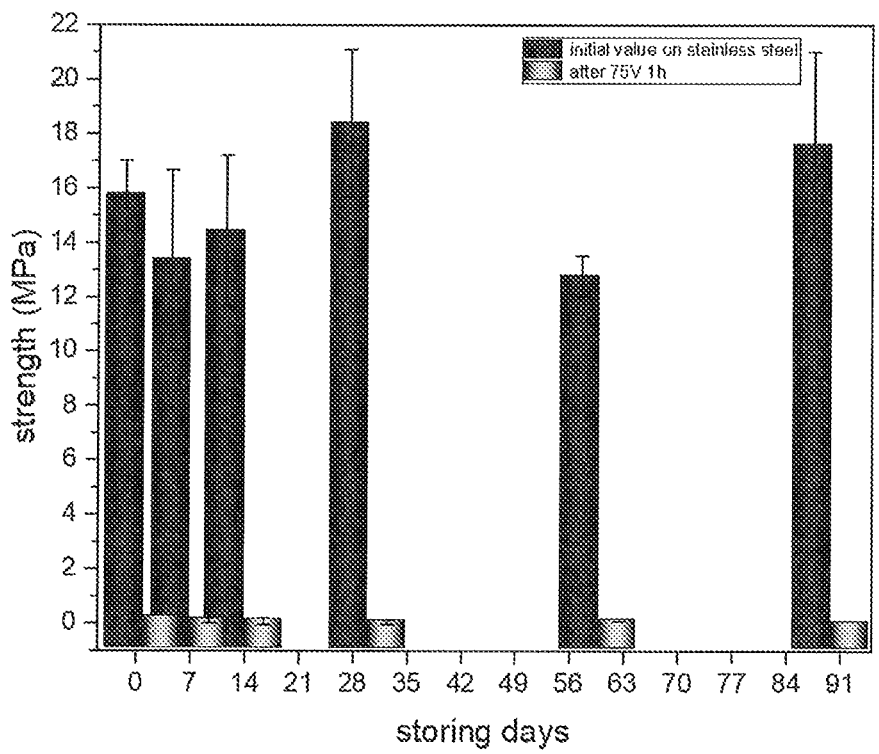

The stability results are illustrated in FIGS. 5a and 5b. FIG. 5a illustrates adhesion properties and debonding effect on aluminium, while FIG. 5b illustrates the same on stainless steel. The test results show that the composition according to the present invention has good initial adhesion properties and does not lose them over the time. In addition, the composition according to the present invention has good initial debonding effect and maintains it over the time.

Example 7

Parts (A) and (B) of a composition 6a and 6b were prepared in accordance with Table 13 herein below. Compositions 6a and 6b were prepared and tested according to the methods described in example 1.

TABLE 13

| | Composition 6a Part A | | | |
|---|---|---|---|---|
| Component | Weight [g] | % by weight of stated part | Composition 6a | |
| Methylmethacrylate | 5.63 | 54.98% | 6.01 | 60.69 |
| Methacrylic acid | 1.22 | 11.96% | 1.32 | 13.20 |
| 1-Ethyl-3-methylimidazolium methanebsulfonate | 1.00 | 17% | 2.1 | 20.9 |
| Clearstrength XT 100 | 1.46 | 14.17% | 0.00 | |
| Cab-O-Sil TS 720 | 0.19 | 1.89% | 0.52 | 5.23 |
| Total | 10.0 | 100.00% | 10 | 100 |

| | Composition 6a Part B | | | |
|---|---|---|---|---|
| Part B | Weight [g] | % by weight of stated part | Composition 6b Part B | |
| Ferrocene | 0.02 | 0.17% | 0.02 | 0.17% |
| D.E.R. 331 | 3.61 | 36.36% | 3.61 | 36.36% |
| Benzoyl peroxide | 6.31 | 63.47% | 6.31 | 63.47% |
| Total | 10 | 100% | 10 | 100% |

For a substrate, tensile lap shear strength was investigated both after said storage period and subsequent to the application of a constant potential of 75V across the adhesive layer for a duration of 20 minutes. The results are documented in Table 14 herein below. The test results are illustrated in FIG. 6.

TABLE 14

| Substrate AA6016 | Initial Bond Strength (MPa) | Bond Strength after 75 V, 20 minutes (MPa) |
|---|---|---|
| Composition 6a | 18.19 (±1.3) | 5.19 (±1.9) |
| Composition 6b | 10.38 (±2.2) | 0.64 (±) |

Example 8

Composition 7 was prepared in accordance with Table 15 herein below. It is noted that methacrylic acid was left out from the composition, otherwise the composition is according to the present invention.

TABLE 15

| | Part A | |
|---|---|---|
| Component | Weight [g] | % by weight of stated part |
| Methylmethacrylate | 6.69 | 66.94% |
| Methacrylic acid | 0.00 | |
| 1-Ethyl-3-methylimidazolium methane sulfonate | 1.70 | 17.00% |
| Clearstrength XT 100 | 1.42 | 14.17% |
| Aerosil 200 | 0.19 | 1.89% |
| Total | 10.0 | 100.00% |

| | Part B | |
|---|---|---|
| Part B | Weight [g] | % by weight of stated part |
| Ferrocene | 0.09 | 0.17% |
| D.E.R. 331 | 3.61 | 36.36% |
| Benzoyl peroxide | 6.31 | 63.47% |
| Total | 10 | 100% |

Composition 7 does not cure, and the electrolyte separates from the composition.

Example 9

Compositions 8a, 8b and 8c were prepared in accordance with Table 16 herein below.

TABLE 16

| | Composition 8a Part A | | Composition 8b Part A | | Composition 8c Part A | |
|---|---|---|---|---|---|---|
| | Weight [g] | % by weight of stated part | Weight [g] | % by weight of stated part | Weight [g] | % by weight of stated part |
| Methylmethacrylate | 5.89 | 58.88% | 5.63 | 56.32% | 5.91 | 59.12% |
| Methacrylic acid | 1.28 | 12.81% | 1.22 | 12.20% | 1.29 | 12.86% |
| 1-Ethyl-3-methylimidazolium methane sulfonate | 1.00 | 10.00% | 1.00 | 10.00% | 1.08 | 10.75% |

TABLE 16-continued

| | Weight [g] | % by weight of stated part | Weight [g] | % by weight of stated part | Weight [g] | % by weight of stated part |
|---|---|---|---|---|---|---|
| Clearstrength XT 100 | 1.52 | 15.17% | 1.46 | 14.56% | 1.52 | 15.24% |
| Aerosil 200 | 0.20 | 2.02% | 0.19 | 1.92% | 0.2 | 2.03% |
| Silver SF7-AT | 0.11 | 1.12% | 0.50 | 5.00% | — | 0 |
| | 10.0 | 100% | 10.0 | 100% | | 100% |

| | Part B | | Part B | | Part B | |
|---|---|---|---|---|---|---|
| | Weight [g] | % by weight of stated part | Weight [g] | % by weight of stated part | Weight [g] | % by weight of stated part |
| Ferrocen | 0.02 | 0.17% | 0.02 | 0.17% | 0.02 | 0.17% |
| D.E.R331 | 3.64 | 36.36% | 3.64 | 36.36% | 3.64 | 36.36% |
| Benzylperoxide | 6.35 | 63.47% | 6.35 | 63.47% | 6.35 | 63.47% |
| Total | 10.0 | 100% | 10.0 | 100% | 10.0 | 100% |

For a substrate, tensile lap shear strength was investigated both after said storage period and subsequent to the application of a constant potential of 75V across the adhesive layer for a duration of 20 minutes. The results are documented in Table 17 herein below and in addition the test results are illustrated in FIG. 7.

TABLE 17

| Substrate AA6016 | Initial bond strength | Bond strength after 75 V 20 minutes |
|---|---|---|
| Composition 8a | 15.19 (±0.86) | 10.69 (±0.74) |
| Composition 8b | 11.94 (±0.5) | 5.93 (±2.27) |
| Composition 8c | 16.92 (±0.46) | 15.44 (±0.28) |

Example 10

Compositions 9a, 9b and 9c were prepared in accordance with Table 18 herein below.

TABLE 18

| | Composition 9a Part A | | Composition 9b Part A | | Composition 9c Part A | | According to Composition 8c | |
|---|---|---|---|---|---|---|---|---|
| | Weight [g] | % by weight of stated part | Weight [g] | % by weight of stated part | Weight [g] | % by weight of stated part | Weight [g] | % by weight of stated part |
| Methylmethacrylate | 5.89 | 58.88% | 5.63 | 56.32% | 5.91 | 59.12% | 5.91 | 59.12 |
| Methacrylic acid | 1.28 | 12.81% | 1.22 | 12.20% | 1.29 | 12.86% | 1.29 | 12.86 |
| 1-Ethyl-3-methylimidazolium methane sulfonate | 1.00 | 10.00% | 1.00 | 10.00% | 1.08 | 10.00% | 1.08 | 10.75 |
| Clearstrength XT 100 | 1.52 | 15.17% | 1.46 | 14.56% | 1.52 | 15.24% | 1.52 | 1.52 |
| Aerosil 200 | 0.20 | 2.02% | 0.19 | 1.92% | 0.2 | 2.03% | 0.2 | 2.03 |
| Printex L (Carbon Black) | 0.11 | 1.12% | | | | | | |
| Kappa 20 PWD (Carbon Black) | — | | 0.11 | 1.12 | | | | |
| Y200 (Carbon Black) | — | | — | | 0.11 | 1.12 | | |
| Garamite (rheology additive) | 0.33 | 3.3 | 0.33 | 3.3 | 0.3 | 3.3 | | |
| | 10.0 | 100% | 10.0 | 100% | | 100% | | |

TABLE 18-continued

|  | Part B | | Part B | | Part B | |
|---|---|---|---|---|---|---|
|  | Weight [g] | % by weight of stated part | Weight [g] | % by weight of stated part | Weight [g] | % by weight of stated part |
| Ferrocen | 0.02 | 0.17% | 0.02 | 0.17% | 0.02 | 0.17% |
| D.E.R.331 | 3.64 | 36.36% | 3.64 | 36.36% | 3.64 | 36.36% |
| Benzylperoxide | 6.35 | 63.47% | 6.35 | 63.47% | 6.35 | 63.47% |
| Total | 10.0 | 100% | 10.0 | 100% | 10.0 | 100% |

For a substrate, tensile lap shear strength was investigated both after said storage period and subsequent to the application of a constant potential of 75V across the adhesive layer for a duration of 20 minutes. The results are documented in Table 19 herein below.

TABLE 19

| Substrate AA6016 | Initial Bond Strength (MPa) | Bond Strength after 75 V, 20 minutes (MPa) |
|---|---|---|
| Composition 9a | 7.59 (±1.48) | 3.6 (±1.33) |
| Composition 9b | 10.16 (±1.11) | 4.73 (±2.06) |
| Composition 9c | 11.82 (±0.29) | 4.55 (±1.55) |
| Composition 8c | 16.92 (±0.46) | 15.44 (±0.28) |

Example 11

Different electrolyte concentrations were tested. Compositions 10a, 10b, 10c, 10d and 10e were prepared in accordance with Tables 20A and 20B herein below.

TABLE 20A

|  | Composition 10a Part A | | Composition 10b Part A | | Composition 10c Part A | |
|---|---|---|---|---|---|---|
|  | Weight [g] | % by weight of stated part | Weight [g] | % by weight of stated part | Weight [g] | % by weight of stated part |
| Methylmethacrylate | 8.63 | 43.14 | 8.42 | 42.14 | 8.23 | 41.14 |
| Methacrylic acid | 1.96 | 9.81 | 1.96 | 9.81 | 1.96 | 9.81 |
| 1-Ethyl-3-methylimidazolium methane sulfonate | 2.4 | 12 | 2.6 | 13 | 2.8 | 14 |
| Clearstrength XT 100 | 2.6 | 13.01 | 2.6 | 13.01 | 2.6 | 13.01 |
| Aerosil 200 | 0.344 | 1.72 | 0.344 | 1.72 | 0.344 | 1.72 |
| PEG 400 | 0.36 | 1.83 | 0.36 | 1.83 | 0.36 | 1.83 |
| Zeoforte ZSC2195LCX | 0.8 | 4.00 | 0.8 | 4.00 | 0.8 | 4.00 |
| Kraton D1155 | 0.8 | 4.00 | 0.8 | 4.00 | 0.8 | 4.00 |
| Blendex 338 | 0.8 | 4.00 | 0.8 | 4.00 | 0.8 | 4.00 |
| Crayvallac SLT | 0.8 | 4.00 | 0.8 | 4.00 | 0.8 | 4.00 |
| Harcyl 1228 (phosphoric acid 2-hydroxyethyl methacrylate ester) | 0.2 | 1.00 | 0.2 | 1.00 | 0.2 | 1.00 |
| 2,2'-(4-methylphenylimino) diethanol | 0.3 | 1.5 | 0.3 | 1.5 | 0.3 | 1.5 |
|  | 20.0 | 100% | 20.0 | 100% | 20 | 100% |

|  | Part B | | Part B | | Part B | |
|---|---|---|---|---|---|---|
|  | Weight [g] | % by weight of stated part | Weight [g] | % by weight of stated part | Weight [g] | % by weight of stated part |
| Ferrocen | 0.017 | 0.17% | 0.017 | 0.17% | 0.017 | 0.17% |
| D.E.R. 331 | 3.626 | 36.26% | 3.626 | 36.26% | 3.626 | 36.26% |
| Benzoylperoxid | 5.34 | 53.37% | 5.34 | 53.37% | 5.34 | 53.37% |
| GPX 801 | 0.02 | 0.20% | 0.02 | 0.20% | 0.02 | 0.20% |
| Polyester | 1.0 | 10.00% | 1.0 | 10.00% | 1.0 | 10.00% |
| Total | 10.0 | 100% | 10.0 | 100% | 10.0 | 100% |

TABLE 20B

|  | Composition 10d Part A | | Composition 10e Part A | |
|---|---|---|---|---|
|  | Weight [g] | % by weight of stated part | Weight [g] | % by weight of stated part |
| Methylmethacrylate | 8.13 | 40.64 | 8.03 | 40.14 |
| Methacrylic acid | 1.96 | 9.81 | 1.96 | 9.81 |
| 1-Ethyl-3-methylimidazolium methane sulfonate | 2.9 | 14.5 | 3.0 | 15 |
| Clearstrength XT 100 | 2.6 | 13.01 | 2.6 | 13.01 |
| Aerosil 200 | 0.344 | 1.72 | 0.344 | 1.72 |
| PEG 400 | 0.36 | 1.83 | 0.36 | 1.83 |
| Zeoforte ZSC2195LCX | 0.8 | 4.00 | 0.8 | 4.00 |
| Kraton D1155 | 0.8 | 4.00 | 0.8 | 4.00 |
| Blendex 338 | 0.8 | 4.00 | 0.8 | 4.00 |
| Crayvallac SLT | 0.8 | 4.00 | 0.8 | 4.00 |
| Harcyl 1228 (phosphoric acid 2-hydroxyethyl methacrylate ester) | 0.2 | 1.00 | 0.2 | 1.00 |
| 2,2'-(4-methyl-phenylimino) diethanol | 0.3 | 1.5 | 0.3 | 1.5 |
|  | 20 | 100% | 20 | 100% |
|  | Part B | | Part B | |
|  | Weight [g] | % by weight of stated part | Weight [g] | % by weight of stated part |
| Ferrocen | 0.017 | 0.17% | 0.017 | 0.17% |
| D.E.R. 331 | 3.626 | 36.26% | 3.626 | 36.26% |
| Benzoylperoxid | 5.34 | 53.37% | 5.34 | 53.37% |
| GPX 801 | 0.02 | 0.20% | 0.02 | 0.20% |
| Polyester | 1.0 | 10.00% | 1.0 | 10.00% |
| Total | 10.0 | 100% | 10.0 | 100% |

For a substrate, tensile lap shear strength was investigated both after said storage period and subsequent to the application of a constant potential of 30V across the adhesive layer for a duration of 20 minutes. The results are documented in Table 21 herein below. The test results are illustrated in FIG. 8.

TABLE 21

| Substrate AA6016 | Initial bond strength | Bond strength after 75 V 20 minutes |
|---|---|---|
| Composition 10a | 17.41_(±1.04) | 7.66 (±3.29) |
| Composition 10b | 16.09 (±1.17) | 4.13 (±0.22) |
| Composition 10c | 16.28 (±1.37) | 1.84 (±0.84) |
| Composition 10d | 13.03 (±0.93) | 1.43 (±0.34) |
| Composition 10e | 12.12 (±2.24) | 0.98 (±0.37) |

Example 12

Different toughener and core shell particles concentrations showing improvement of T-Peel and impact to aging test (90% Rh), stability and LSS values. Compositions 11a, 11b, 11c, 11d and 11e were prepared in accordance with Table 22 herein below.

TABLE 22

|  | Composition 11a Part A | | Composition 11b Part A | | Composition 11c Part A | | Composition 11d Part A | | Composition 11e Part A | |
|---|---|---|---|---|---|---|---|---|---|---|
|  | Weight [g] | % by weight of stated part | Weight [g] | % by weight of stated part | Weight [g] | % by weight of stated part | Weight [g] | % by weight of stated part | Weight [g] | % by weight of stated part |
| Methylmethacrylate | 5.05 | 50.47 | .05 | 50.47 | 4.78 | 47.82 | 4.65 | 46.49 | 4.2 | 42.03 |
| Methacrylic acid | 1.96 | 10.97 | 1.09 | 10.97 | 1.04 | 10.39 | 1.01 | 10.11 | 0.91 | 9.14 |
| 1-Ethyl-3-methylimidazolium methane sulfonate | 2.4 | 10 | 1.0 | 10 | 1.0 | 10 | 1.0 | 10 | 1.0 | 10 |
| Clearstrength XT 100 | 2.6 | 13.01 | 1.3 | 13.01 | 1.23 | 12.33 | 1.2 | 11.98 | 1.0 | 10 |
| Aerosil 200 | 0.344 | 1.72 | 0.17 | 1.72 | 0.16 | 1.63 | 0.16 | 1.58 | 0.15 | 1.5 |
| PEG 400 | 0.36 | 1.83 | 0.183 | 1.83 | 0.183 | 1.83 | 0.18 | 1.83 | 0.18 | 1.83 |
| Kraton D1155 | 0 | 0 | 0.4 | 4.00 | 0.6 | 6.00 | 1 | 10.00 | 1 | 10.00 |
| Blendex 338 | 0 | 0 | 0.4 | 4.00 | 0.6 | 6.00 | 0.4 | 4.00 | 1 | 10.00 |
| Crayvallac SLT | 0.8 | 4.00 | 0.4 | 4.00 | 0.4 | 4.00 | 0.4 | 4.00 | 0.4 | 4.00 |
|  | 10.0 | 100% | 10.0 | 100% | 10 | 100% | 10 | 100% | 10 | 100% |

TABLE 22-continued

| | Part B | | Part B | | Part B | | Part B | | Part B | |
|---|---|---|---|---|---|---|---|---|---|---|
| | Weight [g] | % by weight of stated part | Weight [g] | % by weight of stated part | Weight [g] | % by weight of stated part | Weight [g] | % by weight of stated part | Weight [g] | % by weight of stated part |
| Ferrocen | 0.02 | 0.17% | 0.02 | 0.17% | 0.02 | 0.17% | 0.02 | 0.17% | 0.02 | 0.17% |
| D.E.R. 331 | 3.64 | 36.36% | 3.64 | 36.36% | 3.64 | 36.36% | 3.64 | 36.36% | 3.64 | 36.36% |
| Benzoylperoxid | 6.35 | 63.47% | 6.35 | 63.47% | 6.35 | 63.47% | 6.35 | 63.47% | 6.35 | 63.47% |
| Total | 10.0 | 100% | 10.0 | 100% | 10.0 | 100% | 10.0 | 100% | 10.0 | 100% |

For a substrate, tensile lap shear strength was investigated both after said storage period and subsequent to the application of a constant potential of 30V across the adhesive layer for a duration of 20 minutes. The results are documented in Table 23 herein below.

TABLE 23

| Substrate AA6016 | Initial bond strength | Bond strength after 75 V 20 minutes |
|---|---|---|
| Composition 11a | 10.54 (±1.5) | 0.54 (± 0.24) |
| Composition 11b | 15.28 (±0.86) | 5.38 (±0.51) |
| Composition 11c | 15.33 (±1.37) | 2.34 (±0.3) |
| Composition 11d | 14 (±0.35) | 5.12 |
| Composition 11e | 16.55 (±0.07) | 5.5 (±0.4) |

Table 24 below shows Lap shear Strength (LSS) test results, which are also illustrated in FIG. 9.

TABLE 24

| Substrate AA6016 | Wedge impact test (ISO 11343) | Peel Strength (STM 710) |
|---|---|---|
| Composition 11a | 1.15 (±1.31) | 0 |
| Composition 11b | 12.8 (±2.8) | 2.38 |
| Composition 11c | 1.63 (±0.99) | 2.39 |
| Composition 11d | 1.05 (±0.06) | 3.45 |
| Composition 11e | 9.46 (±0.84) | 2.44 |

What is claimed is:

1. A curable and debondable two-part adhesive composition comprising:
    a first part comprising
    (meth)acrylate monomer;
    co-polymerizable acid; and
    an electrolyte; and
    a second part comprising
    a first curing agent for the (meth)acrylate monomers of said first part;
    a second curing agent for the (meth)acrylate monomer of said first part; and
    a solubilizer, wherein said first part and/or said second part further comprise electrically conductive particles selected from the group consisting of carbon black, silver and mixtures thereof.

2. A curable and debondable two-part adhesive composition according to claim 1, wherein said (meth)acrylate monomer is selected from the group consisting of methyl (meth)acrylate, ethyl (meth)acrylate, n-propyl (meth)acrylate, isopropyl (meth)acrylate, n-butyl(meth)acrylate, isobutyl (meth)acrylate, tert-butyl (meth)acrylate, n-pentyl (meth)acrylate, n-hexyl (meth)acrylate, cyclohexyl (meth) acrylate, n-heptyl (meth)acrylate, n-octyl(meth)acrylate, 2-ethylhexyl-(meth)acrylate, nonyl (meth) acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl(meth)acrylate, glycidyl (meth)acrylate, isobornyl (meth)acrylate, 2-aminoethyl (meth)acrylate, γ-(meth)acryloyloxypropyl trimethoxysilane, (meth)acrylic acid-ethylene oxide adduct, trifluoromethylmethyl (meth) acrylate, 2-trifluoromethylethyl (meth)acrylate, 2-perfluoro ethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth) acrylate, trimethylolpropane tri(meth) acrylate, dipentaerythritol monohydroxy penta(meth)acrylate, tripropylene glycol di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate and mixtures thereof.

3. A curable and debondable two-part adhesive composition according to claim 1, wherein said (meth)acrylate monomer component is present in an amount of from 20 to 80% by weight of the total weight of the first part.

4. A curable and debondable two-part adhesive composition according to claim 1, wherein said co-polymerizable acid is selected from the group consisting of methacrylic acid, acrylic acid, itaconic acid, maleic acid, aconitic acid, crotonic acid, fumaric acid and mixtures thereof.

5. A curable and debondable two-part adhesive composition according to claim 1, wherein said copolymerisable acid is present in an amount of from 0.25 to 20% by weight of the total weight of the first part.

6. A curable and debondable two-part adhesive composition comprising:
    a first part comprising
    (meth)acrylate monomer;
    co-polymerizable acid; and
    an electrolyte; and
    a second part comprising
    a first curing agent for the (meth)acrylate monomers of said first part;

a second curing agent for the (meth)acrylate monomer of said first part; and a solubilizer, wherein said electrolyte is selected from the group consisting of 1-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di (2-hydroxyethyl) ammonium trifluoroaetate, N,N-dimethyl (2-hydroxyethyl) ammonium octanoate, methyltrioctylammonium bis (trifluoromethylsulfonyl) imide, N-ethyl-N—N—N—N-tetramethylguanidinium trifluorometanesulfonate, guanidinium trifluoromethanesulfonate, 1-butyl-4-methylpyridinium bromide, 1-buthyl-3-methylpyridinium tetrafluoroborate, 1-butyl-3-hydroxymethylpyridinium ethylsulfate, 1-butyl-1-methylpyrrolidinium bis (trifluormethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2, 3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris(pentafluoroethyl) trifluorophosphate, trihexyl (tetradecyl) phosphonium tetrafluoroborate and mixtures thereof.

7. A curable and debondable two-part adhesive composition according to claim 1, wherein said electrolyte is present in an amount of from 2.5 to 25% by weight of the total weight of the first part.

8. A curable and debondable two-part adhesive composition according to claim 1, wherein said first curing agent is a peroxide curing agent,
said peroxide curing agent selected from the group consisting of tert-butyl peroxide, tert-butyl perbenzoate, cumene hydroperoxide, tert-butyl peroxybenzoate, diacetyl peroxide, benzoyl peroxide, tert-butyl peracetate, lauryl peroxide and mixtures thereof.

9. A curable and debondable two-part adhesive composition according to claim 1, wherein said first curing agent is present in an amount of from 25 to 75% by weight of the total weight of the second part.

10. A curable and debondable two-part adhesive composition comprising:
a first part comprising
(meth)acrylate monomer;
co-polymerizable acid; and
an electrolyte; and
a second part comprising
a first curing agent for the (meth)acrylate monomers of said first part;
a second curing agent for the (meth)acrylate monomer of said first part; and
a solubilizer, wherein said second curing agent is a metal compound selected from salts and complexes of iron, copper, cobalt, vanadium and manganese.

11. A curable and debondable two-part adhesive composition according to claim 1, wherein said second curing agent is present in an amount of from 0.01 to 5% by weight of the total weight of the second part.

12. A curable and debondable two-part adhesive composition according to claim 1, wherein said solubilizer is polyethylene glycol or epoxy resin selected from the group consisting of cycloaliphatic epoxides, epoxy novolac resins, bisphenol-A-epoxy resins, bisphenol-F-epoxy resins, bisphenol-A epichlorohydrin based epoxy resins, alkyl epoxides, limonene dioxides, polyepoxides and mixtures thereof.

13. A curable and debondable two-part adhesive composition according to claim 1, wherein said solubilizer is present in an amount of from 20 to 45% by weight of the total weight of the second part.

* * * * *